(12) United States Patent
Kawai

(10) Patent No.: US 7,783,498 B2
(45) Date of Patent: Aug. 24, 2010

(54) ELECTRONIC GUIDE INFORMATION PROCESSING SYSTEM, INFORMATION DISTRIBUTING APPARATUS, PORTABLE TERMINAL APPARATUS, AND METHOD FOR PROCESSING ELECTRONIC GUIDE INFORMATION

(75) Inventor: Eiji Kawai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1577 days.

(21) Appl. No.: 09/981,696

(22) Filed: Oct. 16, 2001

(65) Prior Publication Data

US 2002/0083000 A1 Jun. 27, 2002

(30) Foreign Application Priority Data

Oct. 17, 2000 (JP) ............................. 2000-317048

(51) Int. Cl.
*G06Q 99/00* (2006.01)
(52) U.S. Cl. ....................................................... 705/1.1
(58) Field of Classification Search ..................... 705/1, 705/1.1
See application file for complete search history.

(56) References Cited

U.S. PATENT DOCUMENTS

| | | | | |
|---|---|---|---|---|
| 5,696,684 A | * | 12/1997 | Ueberschaer | ............... 701/200 |
| 5,995,018 A | * | 11/1999 | Hane et al. | ............... 340/10.34 |
| 6,073,075 A | * | 6/2000 | Kondou et al. | ............. 701/203 |
| 6,091,956 A | * | 7/2000 | Hollenberg | ............. 455/456.5 |
| 6,115,611 A | * | 9/2000 | Kimoto et al. | ........... 455/456.3 |
| 6,125,278 A | * | 9/2000 | Wieczorek et al. | .......... 455/437 |
| 6,169,902 B1 | * | 1/2001 | Kawamoto | ............... 455/456.4 |
| 6,181,935 B1 | * | 1/2001 | Gossman et al. | ............. 455/433 |
| 6,199,099 B1 | * | 3/2001 | Gershman et al. | ........... 709/203 |
| 6,317,594 B1 | * | 11/2001 | Gossman et al. | ......... 455/414.1 |
| 6,352,478 B1 | * | 3/2002 | Gabai et al. | .................... 463/42 |
| 6,356,905 B1 | * | 3/2002 | Gershman et al. | ............. 707/10 |
| 6,401,085 B1 | * | 6/2002 | Gershman et al. | ............... 707/4 |
| 6,473,704 B1 | * | 10/2002 | Ito et al. | ........................ 702/94 |
| 6,587,835 B1 | * | 7/2003 | Treyz et al. | .................... 705/14 |
| 2001/0044896 A1 | * | 11/2001 | Schwartz et al. | ............. 713/169 |
| 2001/0056402 A1 | * | 12/2001 | Ahuja et al. | .................... 705/43 |

FOREIGN PATENT DOCUMENTS

| | | |
|---|---|---|
| JP | 11-154179 | 6/1999 |
| JP | 11-230776 | 8/1999 |
| JP | 2000-023267 | 1/2000 |

\* cited by examiner

*Primary Examiner*—Jonathan Ouellette
(74) *Attorney, Agent, or Firm*—Finnegan, Henderson, Farabow, Garrett & Dunner, L.L.P.

(57) ABSTRACT

An electronic guide information processing system includes: an information distributing apparatus 19 for converting the guide information D1 into electronic guide information, and then distributing the resultant data; and a portable terminal apparatus 14 for recording and reproducing the electronic guide information distributed from the information distributing apparatus 19. The electronic guide information D1 is visually displayed or/and audibly output in the portable terminal apparatus 14. Due to this structure, the information user can obtain the guide information about customers attracting facility in the form of electronic guide information D1, instead of in the form of conventional paper materials such as guidebooks and guide maps. Besides, by employing a system in which the electronic guide information D1 is distributed through broadcasting or communication infrastructure, the information user can easily and timely obtain the guide information about the customers attracting facility before he or she actually visits there.

35 Claims, 23 Drawing Sheets

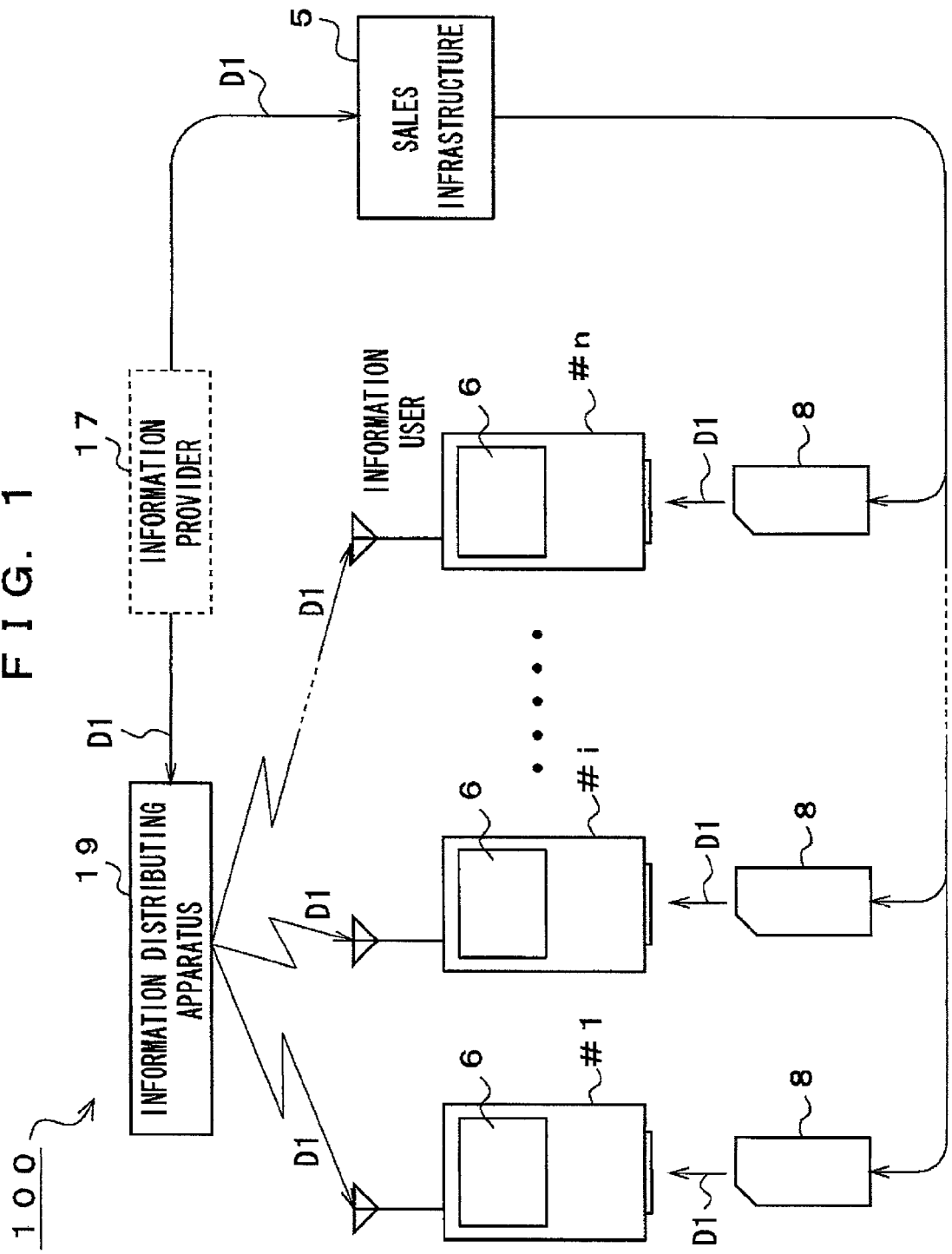

F I G. 1 1
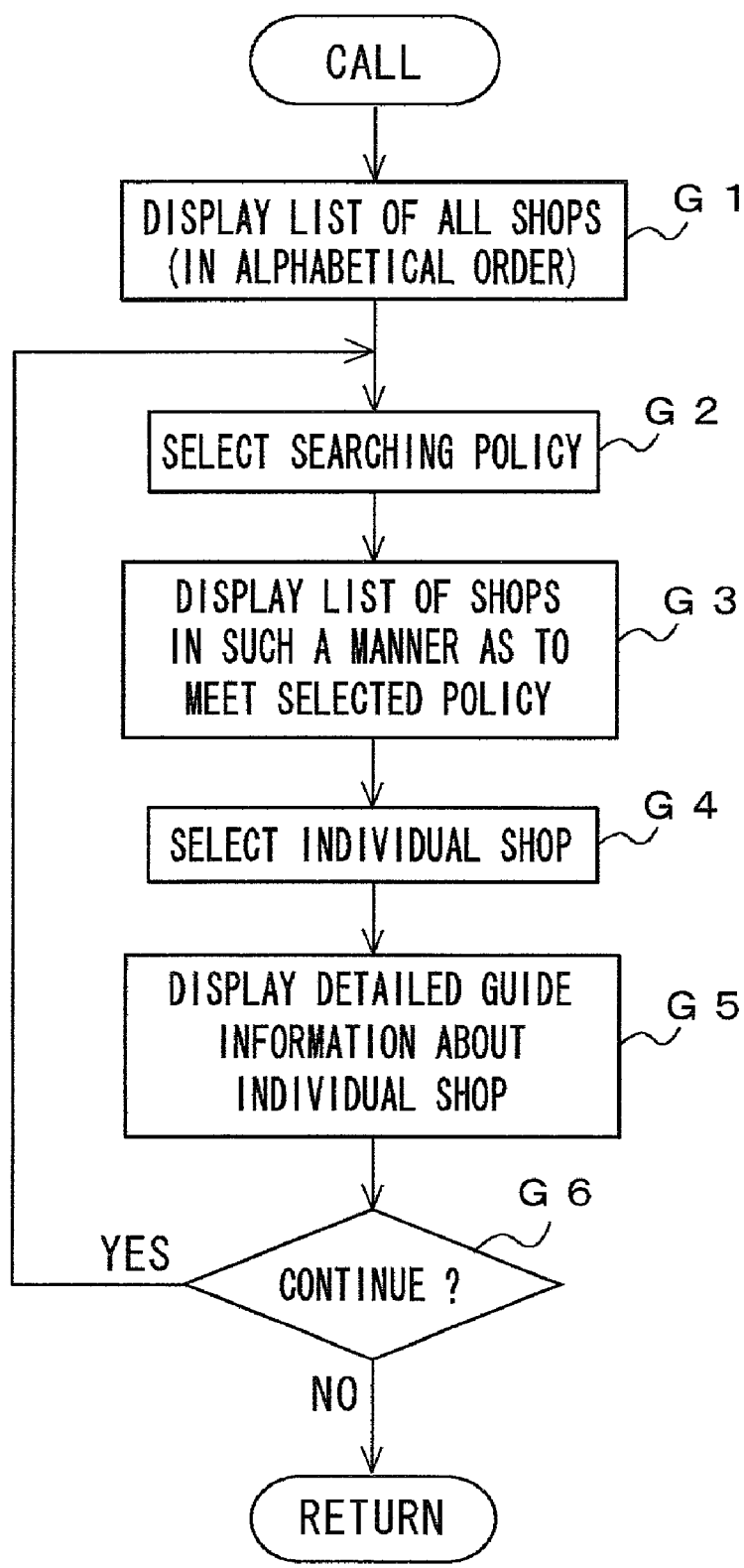

F I G. 1 2
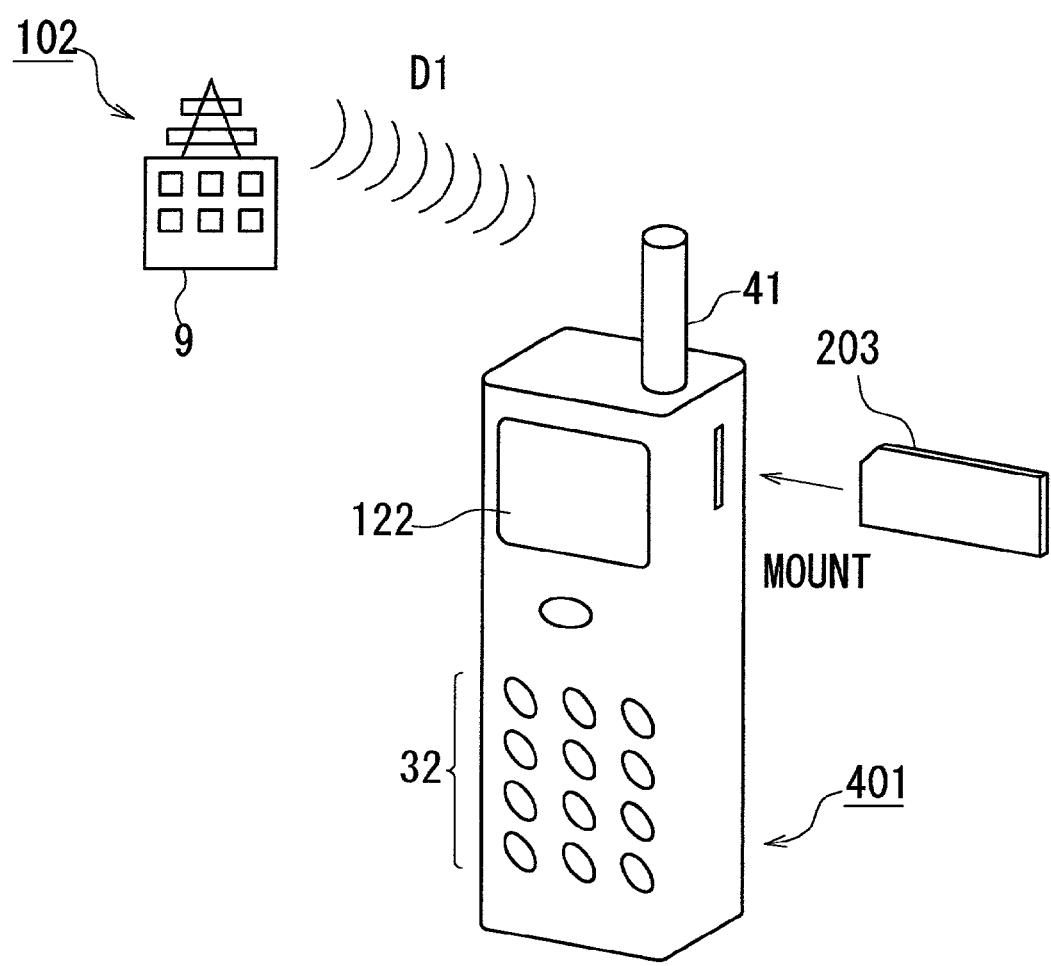

ELECTRONIC GUIDE INFORMATION PROCESSING SYSTEM, INFORMATION DISTRIBUTING APPARATUS, PORTABLE TERMINAL APPARATUS, AND METHOD FOR PROCESSING ELECTRONIC GUIDE INFORMATION

BACKGROUND OF THE INVENTION

1. Field of the Invention

The present invention relates to an electronic guide information processing system, an information distributing apparatus, a portable terminal apparatus, and a method for processing electronic guide information preferable for use in an electronic guide system in a theme park, an event hall, a huge shopping mail, and the like.

2. Description of the Related Art

In recent years, large-scale theme parks and event halls, huge shopping malls and the like have been constructed. In these theme parks and the like, guidebooks and guide maps are independently sold or distributed. In many cases, visitors purchase or obtain the books or maps, and utilize them for prior information before visiting there or for guide information after actually having entered the parks.

Many of the guide materials utilized in the theme parks and the like are in the form of books or pamphlets, or in the form of folding maps. The guide materials in such forms have disadvantages in their operability and searchability. These disadvantages cause problems that visitors cannot understand guide information sufficiently and cannot act efficiently, or loses their ways, and the like.

Through checking the guide materials described above beforehand, information about regular attractions, exhibition booths, and shops are available to some extent. However, unless visitors check information with extra attention about shows, parades, lectures, demonstrations, bargain sales and the like which are scheduled only on the same day the visitor visits, they may miss such events in some cases.

At popular attractions and exhibition booths, they often have to wait entrance in lines for a long time even if they visit there. The long waiting time causes a problem that the visitors cannot effectively use their time.

In an attempt to solve the problems described above, the following methods are conceivable: guide videos related to theme parks and the like (hereinafter, also referred to as customers attracting facilities) are produced; and guide information is converted into electronic data, and is stored in this state into software in a personal computer and the like, thereby enhancing the searchability of the information. However, although the videos can be utilized for obtaining prior information, they are not suitable for use in the actual visit at the customer attracting facilities. The applications for personal computers have a problem that they have disadvantages in the portability and operability, even if note-type personal computers are used.

SUMMARY OF THE INVENTION

The present invention has been made to solve the problems residing in the prior arts such as described above, and the objective thereof is to provide: an electronic guide information processing system which enables information users to obtain guide information about customers attracting facilities in the form of electronic information contents, instead of paper materials in conventional forms such as guidebooks, guide maps; an information distributing apparatus, a portable terminal apparatus, and a method for processing electronic guide information.

The above-described objective is attained by a first electronic guide information processing system for electronically processing guide information about a customers attracting facility, including: an information distributing apparatus for converting the guide information into electronic guide information, and then distributing the resultant electronic guide information; and a portable terminal apparatus for recording and reproducing the electronic guide information which has been distributed from the information distributing apparatus, wherein the electronic guide information is visually displayed or/and audibly output in the portable terminal apparatus.

In the first electronic guide information processing system according to the present invention, when the guide information about customers attracting facility is electronically processed, the guide information is converted into electronic guide information by the information distributing apparatus, and the resultant data is distributed to the portable terminal apparatus which each of information users has. In the portable terminal apparatus, the electronic guide information, which has been distributed from the information distributing apparatus, is recorded and reproduced. At each of the information user side, the electronic guide information is visually displayed or/and audibly output in the portable terminal apparatus.

In this manner, each of the information users can obtain the guide information about customers attracting facility in the form of electronic information contents, instead of in the form of conventional paper materials such as guidebooks and guide maps. Besides, by employing a system in which the electronic guide information is distributed through broadcasting or communication infrastructure, the user can easily and timely obtain the guide information about the customers attracting facility before he or she actually visits there. When new theme parks or event halls are constructed, or there are changes in attractions, the user can timely obtain such information.

According to the present invention, a second electronic guide information processing system for processing electronic guide information about a customers attracting facility which restricts the customers to go in and out only through its entrance and exit, includes: an information lending apparatus for lending the electronic guide information; a portable terminal apparatus for recording and reproducing the electronic guide information which has been lent from the information lending apparatus; and an information collecting apparatus for collecting the electronic guide information which has been lent to the portable terminal apparatus, wherein the system performs processings such that the reading of the electronic guide is permitted at the entrance, while the reading of the electronic guide information is inhibited at the exit.

In the second electronic guide information processing system according to the present invention, in the case of processing the electronic guide information about the customers attracting facility which restricts the customers to go in and out only through its entrance and exit, if the electronic guide information about the customers attracting facility is lent from the information lending apparatus to the portable terminal apparatus for example, the reading of this electronic guide information is permitted at the entrance of this customers attracting facility. At the exit of the facility, the electronic guide information is collected by the information collecting apparatus, and at the same time, the processing for inhibiting the customer from reading this electronic guide information is performed.

In this manner, as long as the information user stays in the customers attracting facility, he or she can read and reproduce the lent electronic guide information by the portable terminal apparatus freely. In addition, an entrance ticket such as required in a conventional system becomes unnecessary, thereby realizing a paperless system in the customers attracting facility. Besides, by introducing a LAN or internet accounting facility by use of a portable terminal apparatus, it becomes possible to realize a moneyless system in the customers attracting facility. As a result, safety level is improved.

According to the present invention, an information distributing apparatus for distributing guide information about a customers attracting facility to an information user, includes: a data inserting section for constructing electronic information contents about the guide information into a group of data strings, and then inserting the resultant group of data strings into a signal for transmission; and a transmitting section for transmitting the signal for transmission into which the constructed data strings have been inserted by the data inserting section to the portable terminal apparatus carried by the information user.

In an information distributing apparatus according to the present invention, in the case of distributing guide information about the customers attracting facility by use of an already-existing broadcasting infrastructure for example, the contents of electronic information about the guide information is constructed into a series of data strings by a data inserting section, and in this state, is inserted into a signal for transmission. The electronic information contents are transmitted in the state where they are multiplexed in a vertical blanking period of a television broadcasting signal (i.e. a signal for transmission) which is employed on the broadcasting infrastructure. The television broadcasting signal into which the data strings have been inserted by the data inserting section, is transmitted from a transmitting section to the portable terminal apparatus of each of the users simultaneously.

In this manner, each of the information users receives the group of the data strings at his or her portable terminal apparatus at a time within a predetermined period, and can stores the group of the data strings in the storage apparatus and the like at a time. As a result, the information user can obtain the guide information about the customers attracting facility easily and timely, before he or she actually visits there.

According to the present invention, a portable terminal apparatus is an apparatus for obtaining and processing electronic guide information about a customers attracting facility, wherein the electronic guide information is received and stored, and the electronic guide information is read in an asynchronous manner in accordance with information manipulation by an information user, and wherein the electronic guide information is visually displayed or/and audibly output.

In the portable terminal apparatus according to the present invention, in the case of obtaining and processing the guide information about the customers attracting facility, the information user can obtain the guide information about the customers attracting facility easily and timely, before he or she actually visits there. In addition, after receiving the electronic guide information, the information user can freely read the guide information about the customers attracting facility in an unreal time manner (i.e. in an asynchronous manner), so as to see or listen to the video or audio information about the theme park or the event hall. In the present invention, the term "unreal time manner" means the state where the provision of information from the information provider and the use of information by the information user are not simultaneously performed. Even if a new theme park or a new event hall is constructed, or there is a change in the attraction, the user can timely obtain the information about such changes.

According to the present invention, a first method for electronically processing guide information about a customers attracting facility, includes the steps of: producing electronic guide information at an information provider side based on the guide information, and distributing the electronic guide information to a portable terminal apparatus carried by an information user; obtaining the distributed electronic guide information at the information user side; and visually displaying or/and audibly outputting the obtained electronic guide information.

In the first method for processing the electronic guide information according to the present invention, in the case of electronically processing the guide information about the customers attracting facility, each of the information users can obtain the guide information about customers attracting facility in the form of electronic information, instead of in the form of conventional paper materials such as guidebooks and guide maps. Besides, by employing a system in which the electronic guide information is distributed through broadcasting or communication infrastructure, the user can easily obtain the guide information about the customers attracting facility before he or she actually visits there. When new theme parks or event halls are constructed, or there are changes in attractions, the user can timely and easily obtain such information.

According to the present invention, a second method for processing electronic guide information about a customers attracting facility which restricts the customers to go in and out only through its entrance and exit, includes the steps of: lending the electronic guide information at the entrance to a portable terminal apparatus carried by an information user; and collecting the lent electronic guide information at the exit from the portable terminal apparatus.

In the second method for processing the electronic guide information according to the present invention, in the case of processing the electronic guide information about the customers attracting facility which restricts the customers to go in and out only through its entrance and exit, as long as the information user stays in the customers attracting facility, he or she can read and reproduce the lent electronic guide information freely. In addition, an entrance ticket such as that required in a conventional system becomes unnecessary, thereby realizing a paperless system in the customers attracting facility. Besides, by introducing a LAN or internet accounting facility by use of a portable terminal apparatus, it becomes possible to realize a moneyless system in the customers attracting facility. As a result, safety level is improved.

BRIEF DESCRIPTION OF THE DRAWINGS

FIG. 1 is a block diagram showing an exemplary structure of an electronic guide information processing system 100 in a first embodiment according to the present invention;

FIG. 11 is a flow chart (subroutine) showing an exemplary processing performed at the time when guide information is searched;

FIG. 12 is an image diagram showing an exemplary structure of a pocket theme park system 102 in a second example according to the present invention;

DETAILED DESCRIPTION OF THE INVENTION

Figure 2:
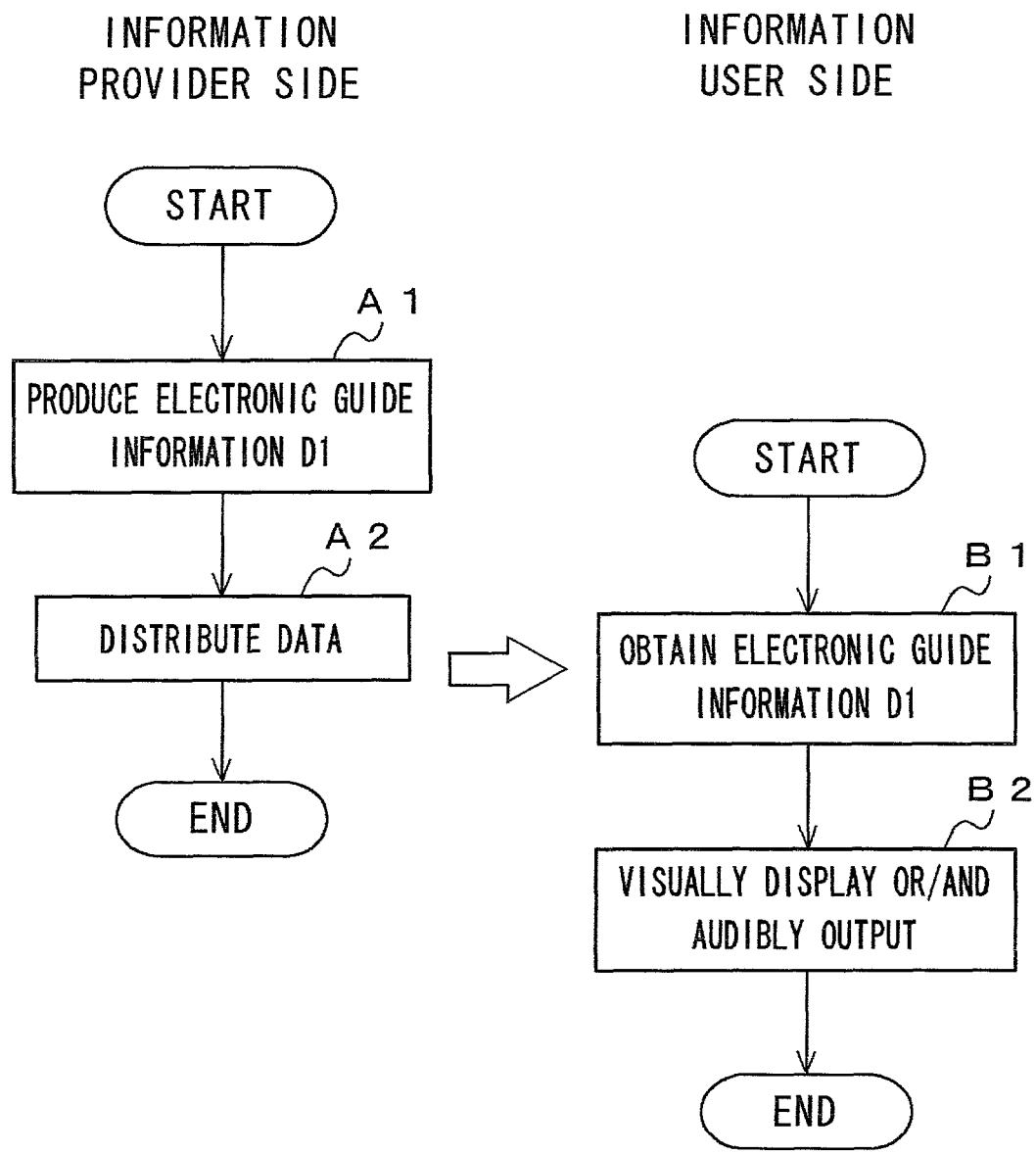
FIG. 2 is a flow chart showing an exemplary processing performed in a first electronic guide information processing system 100 according to the present invention.

Hereinafter, embodiments of an electronic guide information processing system, an information distributing apparatus, a portable terminal apparatus, and a method for processing electronic guide information according to the present invention will be described with reference to the drawings.

(1) First Embodiment

FIG. 1 is a block diagram showing an exemplary structure of an electronic guide information processing system 100 in a first embodiment according to the present invention.

In this embodiment, in order to process guide information about customers attracting facilities such as a theme park and an event hall, an information distributing apparatus for converting such guide information into electronic guide information and for distributing the resultant information, and a portable terminal apparatus for recording and reproducing the electronic guide information are provided. The electronic guide information is visually displayed or/and audibly output. This structure allows the information user to obtain the guide information about the customers attracting facility in the form of electronic information contents, instead of paper materials in conventional forms such as guidebooks and guide maps. At the same time, this structure allows the information user to obtain the guide information about the customers attracting facility easily and timely before he or she actually visits there.

The first electronic guide information processing system 100 shown in FIG. 1 is a system for electronically processing the guide information about the customers attracting facility. In the present invention, the term "customers attracting facility" means a facility or a place where unspecified customers visit such as a theme park, an event hall, a huge shopping mall, and the like.

In the system 100, an information provider 17 has an information distributing apparatus 19 which allows the information provider 17 to convert the guide information about the customers attracting facility into electronic guide information D1 and then to distribute it. The guide information means detailed descriptive information, which has been produced by the information provider, about the attractions and restaurants of the customers attracting facility, and the map information in the vicinity thereof. The electronic guide information D1 means guide information which has been converted into data in such a manner that it can be visually displayed or audibly output. In this embodiment, the electronic guide information D1 includes its dedicated program information D2. Instead of being distributed as included in the electronic guide information D1, the program information D2 may be stored in the portable terminal apparatus.

On the other hand, a portable terminal apparatus #i (i=1 to n) is prepared for each of the information users. The electronic guide information D1 distributed from the information distributing apparatus 19 is recorded and reproduced in the portable terminal apparatus #i. The portable terminal apparatus #i visually displays or audibly outputs the electronic guide information D1. The program information D2 constitutes the procedure of control performed at the time when various kinds of electronic guide information D1 is read in a displaying section 6 in the portable terminal apparatus #i, or when attractions and restaurants are searched. By employing the program information D2, various kinds of guide information can be searched and displayed comfortably.

The electronic guide information D1 is distributed to the portable terminal apparatus #i by use of an already-existing broadcasting infrastructure or communication infrastructure. Obviously, it is also possible to employ both the broadcasting infrastructure and the communication infrastructure in combination. The electronic guide information D1 is not limited to data distribution using the broadcasting infrastructure and the communication infrastructure, but may be provided to the information users in the form of an information recording medium 8 by use of an already-existing sales infrastructure.

In the information recording medium 8, the electronic guide information D1 about the customers attracting facility is recorded. When use, the information recording medium 8 is mounted on the portable terminal apparatus #i. As compared with paper materials in conventional forms such as guidebooks and guide maps, the portable terminal apparatus #i with the electronic guide information D1 has enhanced operability and searchability as a guidebook. Therefore, the use of the portable terminal apparatus #i with the electronic guide information D1 offers remarkable convenience especially at the theme park and event hall when the user actually visits there.

Next, a first method for processing the electronic guide information will be described. FIG. 2 is a flow chart showing an exemplary processing in the first electronic guide information processing system 100 according to the present invention.

In this embodiment, description is made on the assumption that guide information about a customers attracting facility such as a theme park, an event hall, a huge shopping mall, and the like is electronically processed. In the system 100, an information provider has an information distributing apparatus 19 for simultaneously distributing electronic guide information D1 by use of an already-existing broadcasting infrastructure or communication infrastructure. Obviously, description is made taking the case as an example where a portable terminal apparatus #i (i=1 to n) is provided to each of information users.

On the assumption described above, in Step A1 in the flow chart shown in FIG. 2, the information provider produced the electronic guide information D1, based on the guide information about the theme park, the event hall, the huge shopping mall, and the like. For example, the information provider produces detailed descriptive information about the attractions and restaurants of the customers attracting facility, and the map information in the vicinity thereof. By converting the guide information into the form of data, the electronic guide information D1 constituting data strings in a predetermined format is prepared. At this time, program information D2 included in the electronic guide information D1 and dedicated thereto is also produced.

After that, in Step A2, the electronic guide information D1 is distributed at a time from the information distributing apparatus 19 to the portable terminal apparatus #i of the information user through an already-existing data broadcasting, for example, a terrestrial data broadcasting. The data distribution may be performed by any communication means including broadcasting infrastructure such as analog terrestrial television, digital terrestrial television, satellite data broadcasting, FM multiplexed broadcasting, pager, as well as wireless communication infrastructure such as fixed telephone network and portable telephone network, and the internet.

On the other hand, Step B1 employs a method in which the information user obtains the electronic guide information D1 distributed from, for example, a broadcast station. The information D1 is received by a tuner/decoder apparatus in each house, and then is downloaded in the target portable terminal apparatus #i. Obviously, the method employed in Step B1 is not limited to only the method described above, but alternatively, the electronic guide information D1 may be directly received by a portable telephone with receiving/decoding function.

Then, the electronic guide information D1, which has been distributed form the information distributing apparatus 19, is reproduced by the portable terminal apparatus #i in Step B2. For example, the electronic guide information D1 is read in the displaying section 6 of the target portable terminal apparatus #i based on the program information D2, or is visually displayed so as to allow the search of attractions and restaurants, or is audibly output so as to announce the result of such search. In this manner, various kinds of guide information can be comfortably searched and displayed in the portable terminal apparatus #i of the information user.

As described above, in the electronic guide information processing system 100 in the first embodiment according to the present invention, employed is a system in which the electronic guide information D1 is distributed at a time by use of broadcasting or communication infrastructure. As a result, the information user can obtain the guide information about the customers attracting facilities in the form of electronic information contents, instead of paper materials in conventional forms such as guidebooks and guide maps.

In addition, the information user can obtain the guide information about the customers attracting facility easily and timely, before he or she actually visits there. In addition, after receiving the electronic guide information D1, the information user freely reads the guide information about the customers attracting facility in an unreal time manner (i.e. in an asynchronous manner), so as to see or listen to the video or audio information about the theme park or the event hall.

Furthermore, when there are changes in attractions in the theme park or event hall, the user can timely obtain such information. As a result, it is possible to increase the effect of collecting customers to large-sized leisure facilities such as theme parks, event halls, huge shopping malls, and the like. In addition, the economic activities in such customers attracting facilities are promoted. Furthermore, preferable influence to recent economy can be expected, resulting in economic growth.

The electronic guide information D1 is not limited to data distribution using broadcasting infrastructure and communication infrastructure. Alternatively, the electronic guide information D1 about the customers attracting facility is recorded in the information recording medium 8, and in this state, is provided to the information users by use of an already-existing sales infrastructure. When use, the information recording medium 8 is mounted to the portable terminal apparatus #i. As compared with paper materials in conventional forms such as guidebooks and guide maps, the portable terminal apparatus ii with the electronic guide information D1 has enhanced operability and searchability as an electronic guidebook. Therefore, the use of the portable terminal apparatus #i with the electronic guide information D1 affords remarkably increased convenience especially at the theme park and event hall when the user actually visits there.

(2) Second Embodiment

Figure 3:
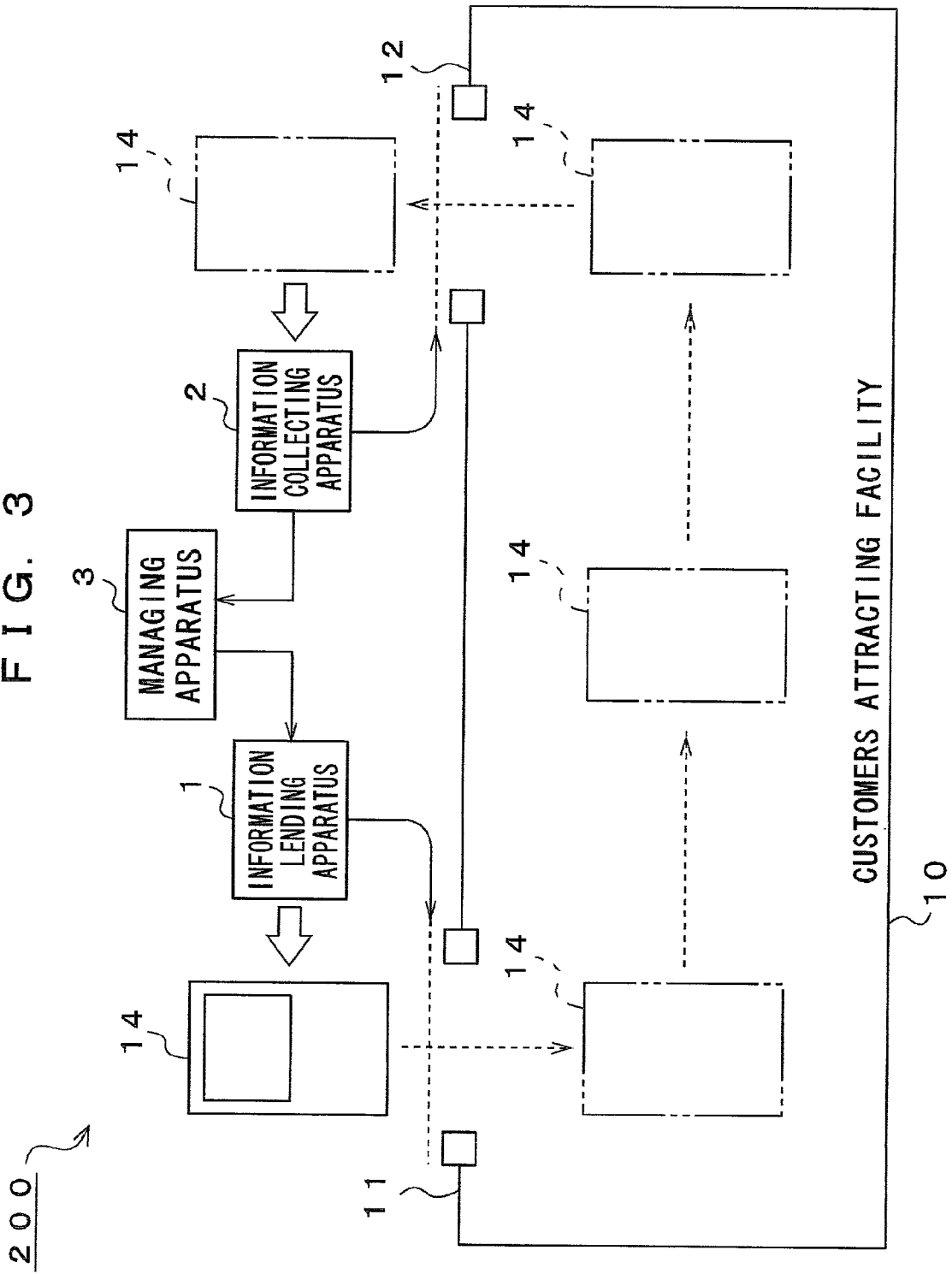
FIG. 3 is a block diagram showing an exemplary structure of an electronic guide information processing system 200 in a second embodiment according to the present invention.

FIG. 3 is a block diagram showing an exemplary structure of an electronic guide information processing system 200 in a second embodiment according to the present invention.

In this embodiment, when electronic guide information is processed at a customers attracting facility which restricts the customers to go in and out only through its entrance and exit, an information lending apparatus for lending the electronic guide information, a portable terminal apparatus for recording and reproducing the electronic guide information which has been lent from the information lending apparatus, and an information collecting apparatus for collecting the electronic guide information are provided. The reading of this electronic guide information is permitted at the entrance of this customers attracting facility, and is inhibited at the exit of the facility. In this manner, as far as the information user stays in the customers attracting facility, he or she can read and reproduce the lent electronic guide information freely in the portable terminal apparatus. In addition, paperless system is realized in the customers attracting facility.

The electronic guide information processing system 200 shown in FIG. 3 is a system for processing the electronic guide information D1 about the customers attracting facility 10 which restricts the customers to go in and out only through its entrance 11 and exit 12. Examples of the customers attracting facility 10 include a theme park, an event hall, a huge leisure facility, and the like. At the window in the vicinity of the entrance 11 of the system 200, an information lending apparatus 1 is provided in order to lend the electronic guide information D1. The electronic guide information D1 is pre-encrypted when downloaded from the information lending apparatus 1 to the portable terminal apparatus 14. At the entrance 11, the electronic guide information D1 is decrypted. That is, the reading of the electronic guide information D1 is permitted at the entrance 11.

On the other hand, the information user prepares the portable terminal apparatus 14 beforehand, and the electronic guide information D1 which has been lend from the information lending apparatus is recorded and reproduced in the portable terminal apparatus 14. It is preferable that the information user always carries the portable terminal apparatus 14 as far as he or she stays in the customers attracting facility 10.

In the vicinity of the exit 12, the information collecting apparatus 2 is provided in order to collect the electronic guide information D1 which has been lent to the portable terminal apparatus 14. At the time when the information is collected, a processing of inhibiting the reading of the electronic guide information D1 at the exit 12 is performed. For example, the electronic guide information D1 is erased at the exit 12. At the time of this processing, information about use status of the customers attracting facility by the information user and/or advertisement information about the customers attracting facility 10 may be written in the portable terminal apparatus 14. The information about use status will be a memento of the visit for the information user, and the advertisement information has an effect of attracting the customer again to the facility for the information provider.

The system 200 may have specific wireless broadcasting means which is effective only within a target area in the customer attracting facility 10. In this case, the electronic guide information D1 is distributed from the specific wireless broadcasting means to the portable terminal apparatus 14. Obviously, this system is made on the assumption that the portable terminal apparatus 14 is provided with receiving means for receiving the wireless broadcasting signal from the specific wireless broadcasting means.

If the portable terminal apparatus 14 has no receiving means such as described above, the receiving means may be lent at the entrance 11 of the customer attracting facility 10. By correlating the electronic guide information D1 received by the receiving means with the electronic guide information D1 which has been already stored in the portable terminal apparatus 14, the real-time electronic guide information D1 which changes every moment can be sequentially taken into the portable terminal apparatus 14 carried by the information user at the large-scale leisure facility such as a theme park and an even hall. As a result, improved convenience is offered to the information user (hereinafter, simply referred to a real-time guide system).

In addition, as a developed system of the system 200, position measuring means may be provided to the portable terminal apparatus 14. The position measuring means measures the latitude, longitude, and altitude by use of an artificial satellite, so as to spot the position of this portable terminal apparatus itself. In this case as well, if the portable terminal apparatus 14 has no position measuring means, the position measuring means may be lent at the entrance 11 of the customers attracting facility 10.

By correlating the information about the measured position obtained by the position measuring means with the map information about the customers attracting facility 10 which has been already stored in the portable terminal apparatus 14, a navigation function can be realized at a large-scale leisure facility such as a theme park and an event hall. This system allows the information user to efficiently act in the customers attracting facility. In addition, this system also improves convenience to the information user, and serves to decrease the number of missing children (hereinafter, simply referred to as a navigation system).

Figure 4:
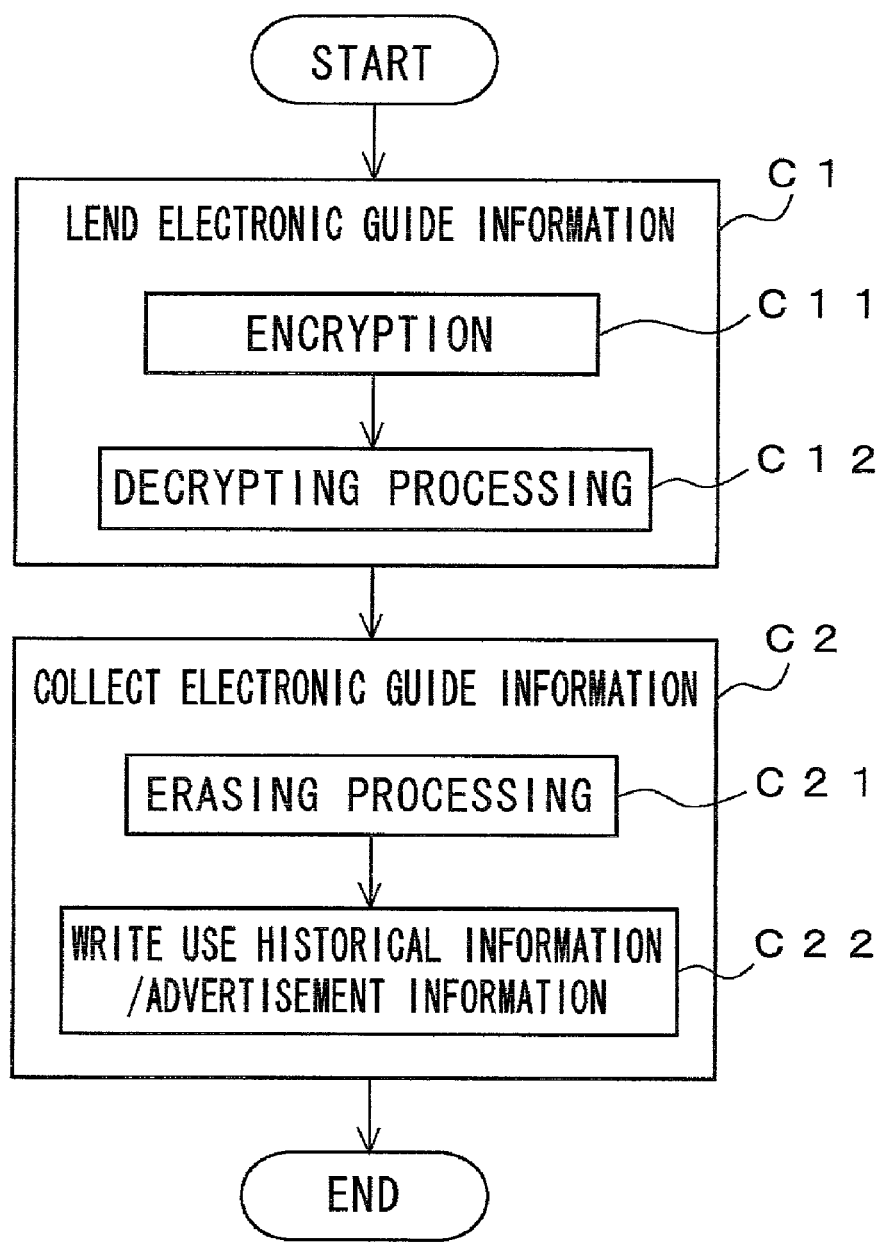
FIG. 4 is a flow chart showing an exemplary processing performed in a second electronic guide information processing system 200 according to the present invention.

Hereinafter, a second method for processing electronic guide information will be described. FIG. 4 a flow chart showing an exemplary processing performed in a second electronic guide information processing system 200.

In this embodiment, description will be made on the following assumption. When electronic guide information D1 is processed at a customers attracting facility 10 which restricts the customers to go in and out only through its entrance 11 and exit 12, an information lending apparatus 1 is provided in the vicinity of the entrance, while an information collecting apparatus 2 is provided in the vicinity of the exit. The reading of the electronic guide information D1 is permitted at the entrance 11, and the reading thereof is inhibited at the exit 12. Obviously, the description will be made taking a case where the portable terminal apparatus 14 is prepared by each of the information users as an example.

On the assumption described above, when the customer enters the customers attracting facility which restricts the customers to go in and out only through its entrance and exit, in Step C1 in the flow chart shown in FIG. 4, the electronic guide information D1 is lent from the information lending apparatus 1 provided in the vicinity of the entrance to the portable terminal apparatus 14 carried by the information user. At this time, the information lending apparatus 1 is connected to the portable terminal apparatus 14, so as to download the electronic guide information D1 about attractions and restaurants from the information lending apparatus 1 to the portable terminal apparatus 14. When downloaded, the electronic guide information D1 has been pre-encrypted by the information provider in Step C11 so that the reading function thereof is locked. The purpose of this procedure is to prevent the electronic guide information D1 from being plagiarized and illegally used by information users.

After that, the procedure proceeds to Step C12 where this electronic guide information D1 is decrypted at the time when the information user steps in the customers attracting facility. That is, the reading of the electronic guide information D1 downloaded in the portable terminal apparatus 14 is permitted at the entrance 11.

While staying in the customers attracting facility 10, the information user always carries the portable terminal apparatus 14, and can reproduce the electronic guide information D1 lent from the information apparatus 1 freely at any number of times. For example, the electronic guide information D1 is read at the displaying section 6 of the portable terminal apparatus 14 which he or she carries, based on program information D2, or visually displayed so as to allow the search of attractions and restaurants, or is audibly output so as to announce the result of such search.

In this manner, various kinds of guide information can be comfortably searched and displayed in the portable terminal apparatus 14 of the information user. In this case, when the real-time guide system or the navigation system is introduced, the information user can spend a significant time, no matter how large the customer attracting facility 10 is.

After that, when the information leaves this customers attracting facility 10, the electronic guide information D1 downloaded in the portable terminal apparatus 14 is collected in Step C2 by the information collecting apparatus 2 provided in the vicinity of the exit 12.

At the time of collecting the information, the electronic guide information D1 is erased at the exit 12 in Step C21. At the same time, information about use status of the customers attracting facility by the information users and/or advertisement information about the customers attracting facility 10 is written in the portable terminal apparatus 14. In this manner, the information user can display the information about his or her use status of the customers attracting facility 10 after he or she leaves there, or can display advertisement information about the next attractions of this customers attracting facility 10.

As in the manner described above, in the method for processing the electronic guide information according to the second embodiment of the present invention, at the customers attracting facility 10 which restricts the customers to go in and out only through its entrance 11 and exit 12, as far as the information user stays inside the customers attracting facility 10, he or she can freely read and reproduce the lent electronic guide information D1 by the portable terminal apparatus 14.

Furthermore, an entrance ticket such as that required in a conventional system becomes unnecessary, thereby realizing a paperless system in the customers attracting facility 10. Besides, by introducing a LAN or internet accounting facility by use of a portable terminal apparatus 14, it becomes possible to realize a moneyless system in the customers attracting facility 10. As a result, increased safety is attained.

(3) First Example

Figure 5:
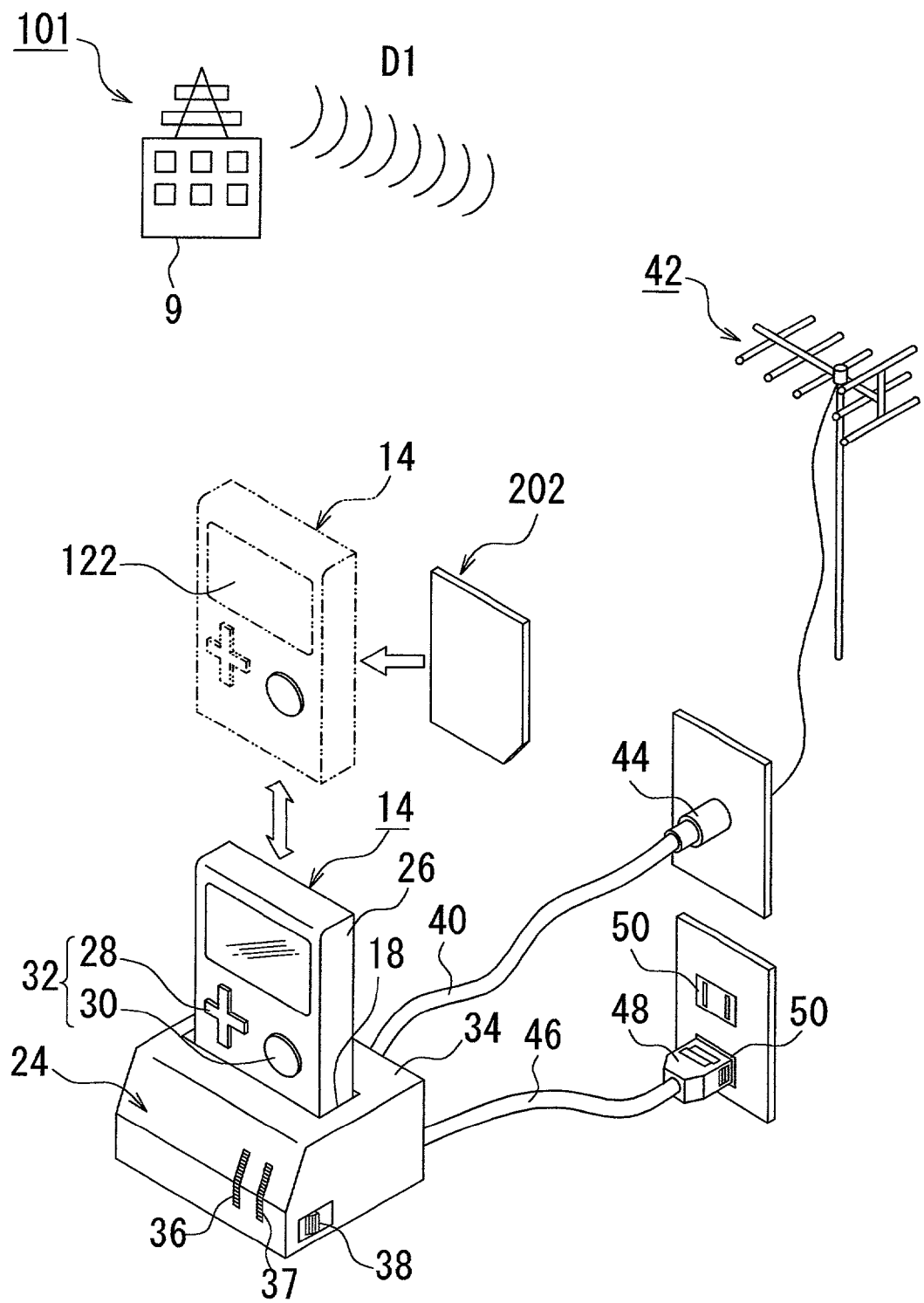
FIG. 5 is an image diagram showing an exemplary structure of a pocket theme park system 101 in a first example according to the present invention.

FIG. 5 is a diagram showing an exemplary structure of a pocket theme park system 101 in a first example according to the present invention.

In this example, when guide information about a large-size leisure facility, a shopping mall, a theme park, an event hall, and the like is electronically processed, an information distributing apparatus 19 for converting such guide information into electronic guide information D1 and then for distributing it, and a portable terminal apparatus 14 for recording and reproducing the electronic guide information D1 are provided. The electronic guide information D1 is visually displayed or/and audibly output. In this manner, the information users can obtain the guide information about customers attracting facility in the form of electronic information, instead of in the form of conventional paper materials such as guidebooks and guide maps. Besides, the information user can easily and timely obtain the guide information about the customers attracting facility before he or she actually visits there.

The first pocket theme park system 101 shown in FIG. 5 is a system for electronically processing guide information about a theme park such as a zoo and an amusement park. In the system 10, the electronic guide information D1 is distributed from a broadcast station 9. The electronic guide information D1 is produced by the information provider, and is detailed descriptive information about the attractions and restaurants of the customers attracting facility, the map information in the vicinity thereof, and the like. The electronic guide information D1 has been converted into data in such a manner that it can be visually displayed or audibly output. In this example, the electronic guide information D1 includes its dedicated program information D2. Instead of being distributed included in as the electronic guide information D1, the program information D2 may be stored in the portable terminal apparatus.

On the other hand, a portable terminal apparatus 14 is prepared for each of the information users. The electronic guide information D1 distributed from the broadcast station 9 is received by a tuner apparatus 24, and then is downloaded into the portable terminal apparatus 14. The downloaded electronic guide information is recorded and reproduced in the portable terminal apparatus 14. The portable terminal apparatus 14 visually displays the electronic guide information D1 or audibly outputs it. The program information D2 constitutes the procedure of control performed at the time when various kinds of electronic guide information D1 is read in a displaying section 6 in the portable terminal apparatus 14, or when attractions and restaurants are searched. By employing the program information D2, various kinds of guide information can be searched and displayed comfortably.

In this example, a tuner apparatus 24 with charging function and a dedicated portable terminal apparatus 14 detachably mounted to the tuner apparatus 24 are provided in order to process the electronic guide information D1 from the broadcast station 9 and game data from a memory card 202. Applications such as games can be enjoyed at any time and any place. In the system 101, the electronic guide information D1 is received and stored by the tuner apparatus 24.

The electronic guide information D1 is not limited to the data distribution through a broadcasting infrastructure and a communication infrastructure, but may be distributed in the form of the memory card 202 as an example of an information recording medium to the information user through an already-existing sales infrastructure. In the memory card 202, the electronic guide information D1 about the theme park is recorded. When used, the memory card 202 is mounted to the portable terminal apparatus 14. The portable terminal apparatus 14 with the memory card 202 exhibits enhanced operability and searchability as a guidebook, taking the place of paper materials in conventional forms such as guide books guide maps.

When the electronic guide information D1 is downloaded from the tuner apparatus 24 to the portable terminal apparatus 14, a (cable or wireless) general serial interface in compliance with UBS, IEEE 1394, IrDA or the like is employed. On top of the serial interface, a cable, wireless, dedicated interface for directly connecting a connector may be provided to the tuner apparatus 24. The data strains, received by the tuner apparatus 24, may be directly stored in an nonvolatile memory in the portable terminal apparatus 14 or a hard disc apparatus, without storing them in the tuner apparatus 24.

To the tuner apparatus 24 with charging function shown in FIG. 5, connected is the detachable portable terminal apparatus 14. A group of data strains downloaded from the tuner apparatus 24 is subjected to image processing in the portable terminal apparatus. The portable terminal apparatus 14 includes a manipulation key 32, a liquid crystal display monitor 122 for displaying an image manipulated by the manipulation key 32.

The liquid crystal display monitor 122 includes a color liquid crystal screen with 320 pixels×240 pixels for example. The secondary battery incorporated in the portable terminal apparatus 14 is charged by inserting the bottom end portion of the portable terminal apparatus 14 into a depressed section 18 of the tuner apparatus 24. A casing 26 of the portable terminal apparatus 14 includes, on top of the liquid crystal display monitor 122 described above, a cross-shaped key 28 constituting the manipulation key 32, and a decision key 30. The decision key 30 has a function of power supply switch of the portable terminal apparatus 14, as will be described later.

On the other hand, the casing 34 of the tuner apparatus 24 includes, on top of the depressed section 18 described above, a receiving display lamp 36 for displaying the charging status such as the status where the charging is proceeding, the status where the charging has been completed, and the like, a receiving display lamp 37 for displaying the status in which the portable terminal apparatus 14 is receiving data, and a channel selecting switch 38 for selecting the channel of a desired broadcasting among data broadcasting.

Furthermore, to the tuner apparatus 24 with the charging function, connected is a coaxial cable 40 which leads to a coaxial terminal 44. To the coaxial terminal 44, connected is an antenna 42 for receiving the electronic guide information D1 as well as the TV program broadcasting provided through a normal ground wave. At the same time, to the tuner apparatus 24, also attached is an AC plug (alternate plug) 48 through a power supply cord 46. The AC plug 48 is connected to a power supply socket 50, so as to receive AC power supply.

Figure 6:
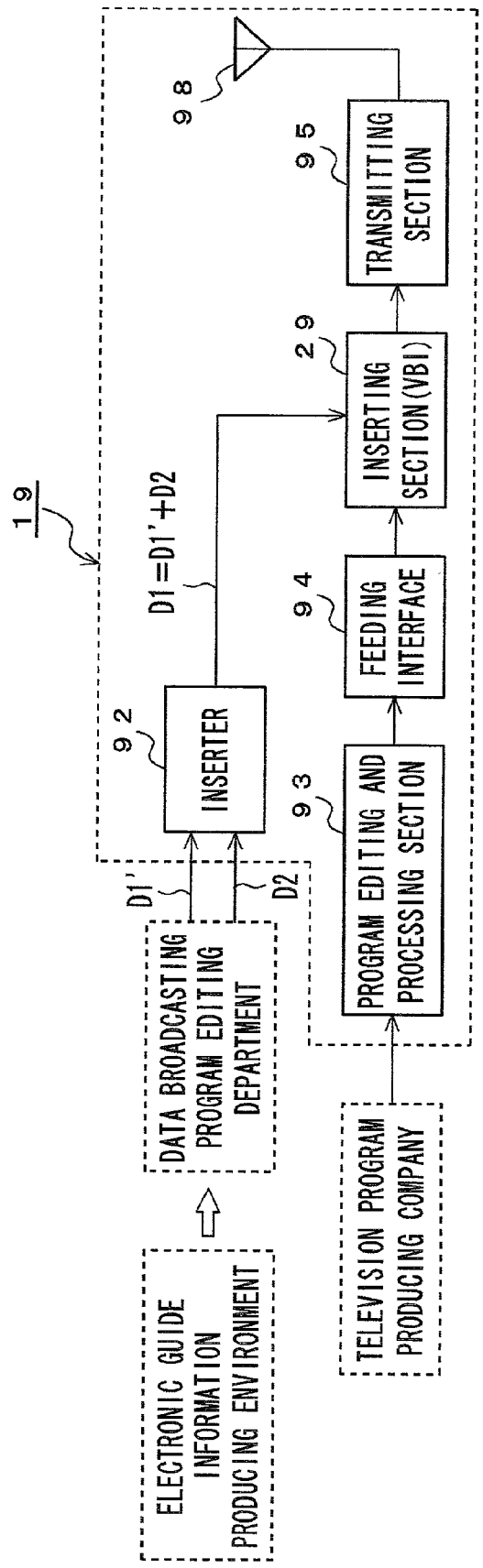
FIG. 6 is a block diagram showing an exemplary structure of an information distributing apparatus 19 and a peripheral system thereof.

Hereinafter, an exemplary structure of the information distributing apparatus 19 provided in the broadcast station 9 and the peripheral system thereof will be described. The information distributing apparatus 19 shown in FIG. 6 is an apparatus for distributing the electronic guide information D1 supplied from the information provider, as well as the TV program broadcasting provided through a normal ground wave.

In this example, the electronic guide information D1 is guide information about a large-size leisure facility, a shopping mall, a theme park, an event hall, and the like, and is produced beforehand in an electronic guide information producing environment. The electronic guide information D1 is produced every month, every week, or every day. Thus-produced electronic guide information D1 is brought into a data broadcasting program producing department. In this department, the electronic guide information D1 and the program information D2 such as applications are edited.

TV programs provided through a normal ground wave are produced by TV program producing companies as in the conventional cases. The information distributing apparatus 19 includes an inserter 92 for inserting the electronic guide information, an inserting section 29, a program editing and processing section 93 for a normal TV program, a feeding interface 94, a transmitting section 95, and an antenna 98.

The inserter 92 is an example of a data inserting section, and converts the electronic guide information D1' such as graphic data and sound data, and the program information D2 such as applications into a group of data strains. The inserter 92 transmits the electronic guide information D1 to the inserting section 29 in order to insert the electronic guide information D1 into a signal for transmission.

On the other hand, TV program information and commercial video through ground wave data broadcasting is provided from a TV program producing company. The TV program information and the commercial video are edited in the program editing and processing section 93 by the information distributing apparatus 19, and then sent to the feeding interfaced 94. In the feeding interface 94, the TV program information and the commercial video are edited and then converted into a predetermined broadcasting format to produce a TV broadcasting signal which will be distributed through a ground wave data broadcasting.

The inserting section 29 is connected to the output stage of the feeding interface 94, and the transmitting section 95 is connected to the inserting section 29. In this structure, during the vertical blanking period of the TV broadcasting signal described above, the electronic guide information D1 about the theme park and the like is converted into a group of data strings and then multiplexed (VBI). The electronic guide information D1 is made to be broadcast on a date and time (late at night) designated beforehand. The group of data strings inserted by the inserting section 29 is modulated in a predetermined modulation mode by the transmitting section 95, and after that, is radiated from the antenna 98 by a predetermined transmitting electric power.

As has been described above, in the information distributing apparatus 19 according to the present invention, when the guide information about a theme park and the like is distributed by use of a data broadcasting bases, the electronic information content D1 is constructed into a group of data strings by the inserter 92, and in this state, is inserted into a signal for transmission. The electronic information content D1 is transmitted in such a manner that it is multiplexed in the vertical blanking period of the television broadcasting signal (signal for transmission) which is employed in the data broadcasting infrastructure. The television broadcasting signal into which the data strings constructed by the inserter 92 have been inserted is transmitted at a time from the transmitting section 95 to the portable terminal apparatus 14.

Therefore, the information user can receive at a time the group of data strings within a predetermined period by his or her portable terminal apparatus 14, and can stores the group of data strings into a nonvolatile storing apparatus and the like at a time. In this manner, the information user can easily and timely obtain the electronic guide information D1 about the theme park and the like before he or she actually visits there.

In addition, after receiving the electronic guide information D1, the information user freely reads the electronic guide information D1 in an unreal time manner, so as to see or listen to the video or audio information about the theme park or the event hall. At the same time, when a new theme park or event hall is constructed, or when there is a change in the attraction, the information provider can update the information in a real-time and smooth manner.

Figure 7:
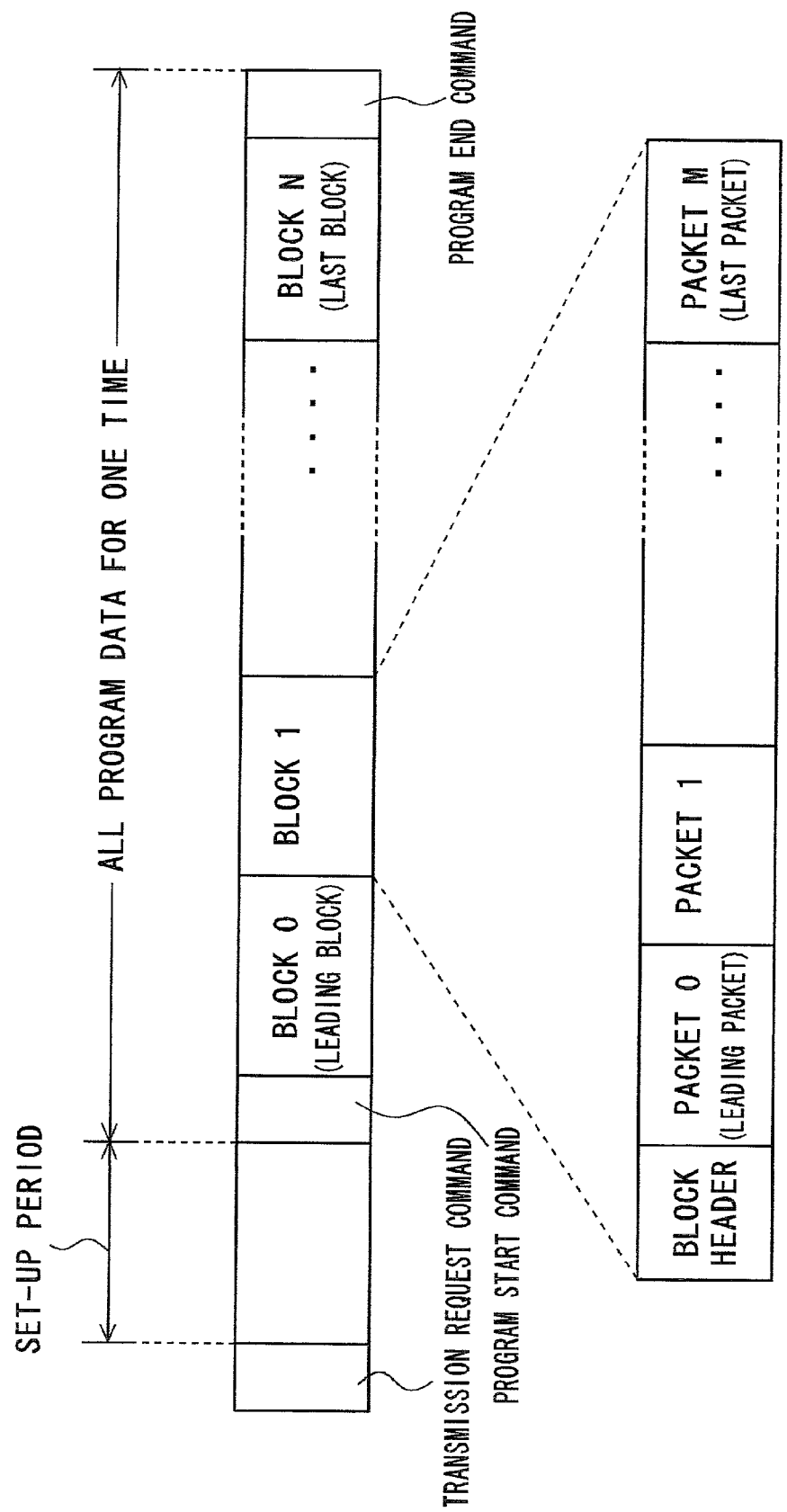
FIG. 7 is a diagram showing an exemplary format of data strings related to electronic guide information D1.

Next, a format of the data strings employed in this theme part system 101 will be described. The format of the data strings shown in FIG. 7 is prepared in the broadcast station 9 beforehand. When transmitted, the main body of the data is divided into each of packets.

In this example, in order to make it possible to automatically receive the data strings even late at night by the tuner apparatus 24 or a portable telephone 401 which will be described later, a transmission request command is described in the leading end of the data strings. The transmission request command is data for initializing (starting up) the portable terminal apparatus 14 in a stand-by status. Subsequent to the transmission request command, a dummy packet is inserted. The dummy packet is made in such a manner that it forms a set-up period. The set-up period is a period of time required until the tuner apparatus 24 comes into a receive ready state.

Next to the set-up period, all the program data for one time is written. The program data is described in a bit data form, and covers the electronic guide information D1 about a theme park and the like. The program data is written without distinguishing in appearance a program code, video information, and audio information from each other.

At the leading end of the program data, a program start command is written, and next to the program start command and thereafter, blocks in the number of N+1 from a block 0 to a block N are written. The electronic guide information D1, the program code, or the contents code of the video or audio information described above is written in units of blocks. The block 0 is a leading block, and the block N is a last block. Subsequent to the block N, a block termination command is written. Each of the blocks 0 to N, for example, the block 1 has a leading end in which a block header is written. In the block header, written are a header code, attributes of the leading end, the intermediate, and the last end and the like of the block, a length of the block such as the number of packets, a contents code, and the like.

Subsequent to the block header, packets in number of M+1 are written in each of the blocks. The packet M is the last packet. In each of the packets 0 to M, for example, in the packet 1, written are a packet code, attributes of the leading end, the intermediate, and the last end and the like of the packet, an error correction code for the parity and the like.

Figure 8:
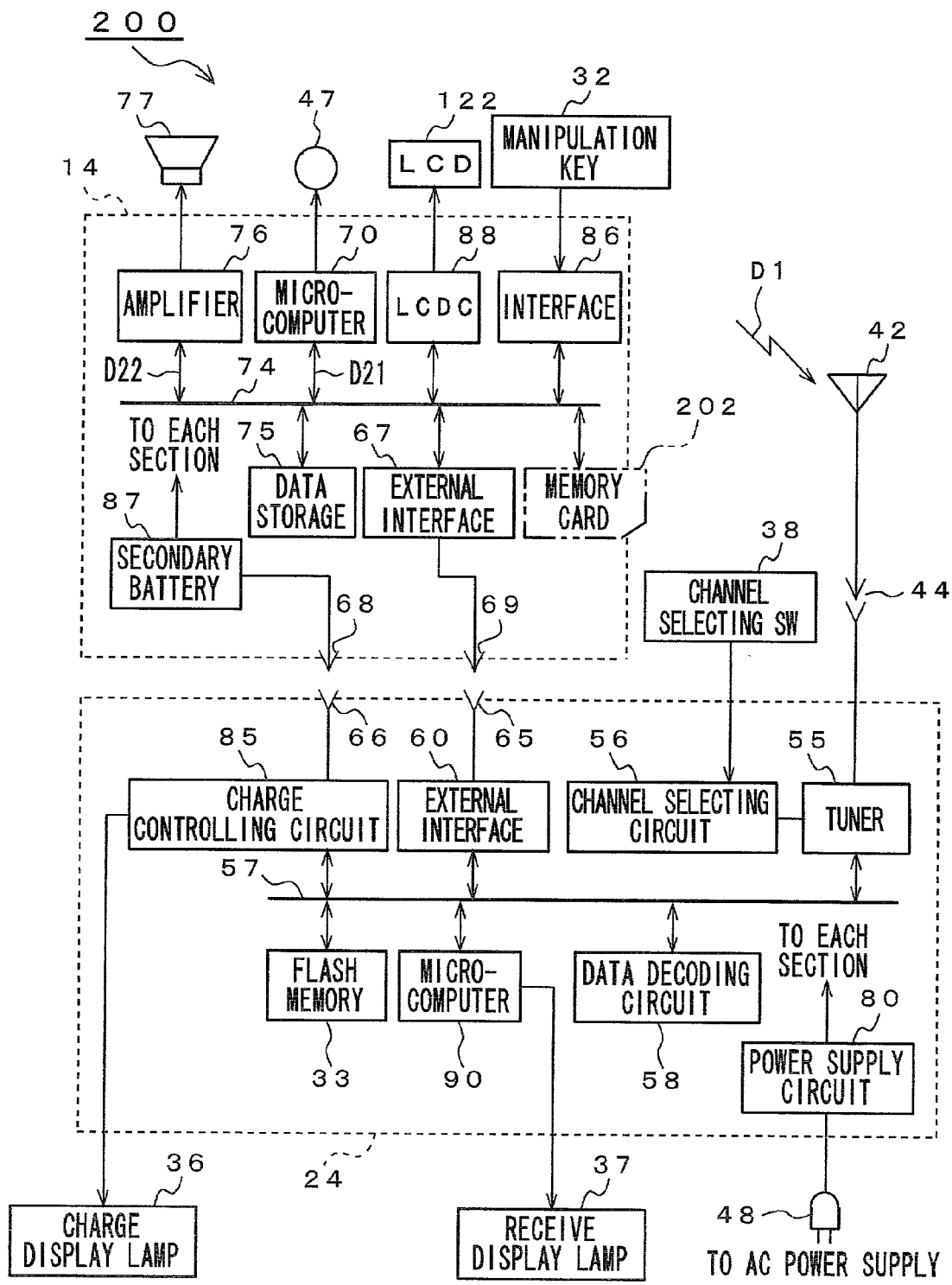
FIG. 8 is a block diagram showing an exemplary inner structure of a tuner apparatus 24 with charging function and a portable terminal apparatus 14.

Next, an exemplary inner structure of the tuner apparatus 24 with charging function and the portable terminal apparatus 14 will be described. FIG. 8 is a diagram showing an exemplary inner structure of the tuner apparatus 24 with charging function and the portable terminal apparatus 14. In this system 101, the dedicated portable terminal apparatus 14 and the tuner apparatus 24 are prepared by the information user, in order to receive and then perform data processing for the electronic guide information D1 provided from the information distributing apparatus 19.

In FIG. 8, the tuner apparatus 24 includes a tuner 55 for receiving the data provided from an external device. The tuner 55 extracts data strains of the electronic guide information D1 from the ground wave data broadcasting signal which has been received by the antenna 42, and then sends the extracted data strains to a bus 57. The tuner apparatus 24 includes a flash memory 33 for storing the data strains transmitted from the bus 57.

In this example, the video information, the audio information, and the program information of the electronic guide information D1 are multiplexed by use of the vertical blanking interleaving interval (VBI), which is an interval of broadcasting radio wave in the NTSC mode for ground wave television broadcasting. It is possible to distribute various kinds of digital contents (contents include videos, images (moving and static images), various information about sounds, characters, numeric values and the like, programs and CMs reproduced in television receivers and radio receivers, and the contents in magazines and newspapers). Therefore, the television radio wave of this ground wave is receivable by the antenna 42 such as a conventional Yagi antenna and the like.

Television broadcasting radio wave includes radio waves of plural channels. In order to selectively receive the radio wave of a desired channel, the selective frequency of the tuner 55 can be switched through a channel selecting circuit 56, based on the channel information set by a channel selecting switch 38. The data strings (in this example, in an NTSC signal) selected by the tuner 55 sent to the bus 57 are decoded in the data decoding circuit 58.

When the NTSC signal includes the data strings of the various kinds of contents described above which have been multiplexed in the broadcast station 9 by use of the VBI, the decoded data such as the video and audio information, the program information D2, the electronic guide information D1 and the like are temporality stored in the flash memory 33, under the control of a microcomputer 90, even in the case where the portable terminal apparatus 14 is not set. When the portable terminal 14 is set, the electronic guide information D1 may be directly transmitted also to the portable terminal apparatus 14 through an external interface 60 which is a serial interface, and a connection terminal 65. The microcomputer 90 and the data decoding circuit 58 constitute together an integrated system LSI structure.

To the tuner apparatus 24 in the structure described above, the detachable portable terminal apparatus 14 is set to receive and then process the electronic guide information D1 about the theme park and the like. For example, the electronic guide information D1 stored in the flash memory in the tuner apparatus 24 is downloaded into the portable terminal apparatus 14. The portable terminal apparatus 14 has a bus 74. To the bus 74, connected are an external interface 67, a microcomputer 70, a data storage 75, an amplifier 76, an interface 86, and a liquid crystal display controller 88 (LCDC). In addition, a memory card 202 is mounted to the bus 74 through an unillustrated connection terminal.

The data strings which has been sent to the portable terminal apparatus 14 through the connection terminal 65 of the tuner apparatus 24 are electrically written into a data storage 75 which is an example of a nonvolatile storage apparatus under the control of the microcomputer 70, through the connection terminal 69, the external interface which is a serial interface, and the bus 74.

The microcomputer 70 is an example of a display controlling section. The microcomputer 70 receives and stores the electronic guide information D1, and reads the electronic guide information D1 from the data storage in an asynchronous manner in accordance with the information manipulation by the information user. At the same time, the microcomputer 70 is controlled to allow the electronic guide information D1 to be visually displayed or/and audibly output. In this example, a guidebook mode is prepared. The guidebook mode is an operation mode in which a map or directory based on the electronic guide information D1 is selected, or a category located at a lower hierarchy in this directory is searched and processed.

In this example, three categories are prepared. That is, 1) a shop and restaurant search guide information processing; 2) an attraction search guide information processing; and 3) a yellow page search guide information processing, and the like are prepared. In each of the information processings, the following items are displayed as a lower hierarchy thereof: a list of all the shops are displayed in an alphabetical order; a choice of searching policy is displayed; individual shops are displayed in such a manner as to meet the selected policy; detailed guide information of individual shops are displayed. On top of this, the memory card 202 is mounted so as to display and control the game data D02.

As the data storage 75 described above, an electrically erasable programmable read-only memory (EEPROM) and the like is used. In this example, the data strains are electrically stored in the flash memory 33, even if no portable terminal apparatus 14 is set to the tuner apparatus 24. When the portable terminal apparatus 14 is set to the tuner apparatus 24, the data strains are transmitted to the data storage 75 in the portable terminal apparatus 14 as a result of the control of the microcomputer 90.

In the case where the data rate of the data broadcasting is about 40 [kbps], and it is desired to store this data at least for 50 minutes, each of the flash memory 33 and the data storage 75 is required to have a storage capacity of 16 [MB]. In this case, the relationship of 40 [kbps]÷8[bit]×50 [min]×60 [sec] =15 [MB] is established.

The microcomputer 70 is a digital calculator. The microcomputer 70 arbitrarily performs an image processing to the electronic guide information D1 based on the program information D2 read from the data storage 75, or performs an image processing to the game data D02 based on the video or audio information read from the memory card 202. Each of the microcomputers 70, 90 includes a central processing unit (CPU), a ROM as a memory (including an EEPROM), a random access memory (RAM), as well as an input and output interface, a clock as clock means, a timer as time-measuring means, and the like. Each of the microcomputers 70, 90 serves as a controlling section, a calculating section, a processing section, and the like. Therefore, as has been described above, it is also possible to implement the function of the data decoding circuit 58 by the microcomputer 90.

To the microcomputer 90 at the side of the tuner apparatus 24, a receive display lamp 37 is connected. The receive display lamp 37 is controlled in such a manner that it is turned on during the time when data is transmitted from the tuner apparatus 24 to the data storage 75, and during the time when data is stored in the data storage 75, while it is turned off in the other cases. It is also possible to control the receive display lamp 37 to flash when the receipt of the data strings is completed.

The tuner apparatus 24 further includes a power supply circuit 80. The power supply circuit 80 converts the alternate voltage such as AC100V supplied from an external AC power supply into a direct voltage, and then supplies the resultant direct voltage to all the blocks within the tuner apparatus 24. In this case, a charge controlling circuit 85 performs charging control in the following manner. That is, the charge controlling circuit 85 converts the direct voltage, which has been supplied from the power supply circuit 80, into a direct current for charging for example. Then, the charge controlling circuit 85 supplies the resultant direct current to the secondary battery 87 of the portable terminal apparatus 14 through the connection terminal 66 and then through the connection terminal 68 of the portable terminal apparatus 14.

The charging control performed by the charge controlling circuit 85 includes the control of detecting the remaining charge and the control of detecting the full charge state of the secondary battery 87, in the state where the charging current is controlled while detecting the temperature of the secondary battery 87. As the secondary battery 87, a lithium ion battery or a NiMH battery may be used.

To the charge controlling circuit 85, a charge display lamp 36 is connected. The charge display lamp 36 is controlled in such a manner that it is turned on during the time when the secondary battery 87 is charged, and is tuned off at the time when the secondary battery 87 is fully charged. To the bus 74 of the portable terminal apparatus 14, also connected is a manipulation key 32 via the interface 86, and a liquid crystal display monitor 122 via the liquid crystal display controller 88. To the above-described bus 74, connected is an audio processing section 76 for performing an audio amplification processing. To the audio processing section 76, a speaker 77 is connected, so as to output audio information about the electronic guide information D1.

Figure 9:
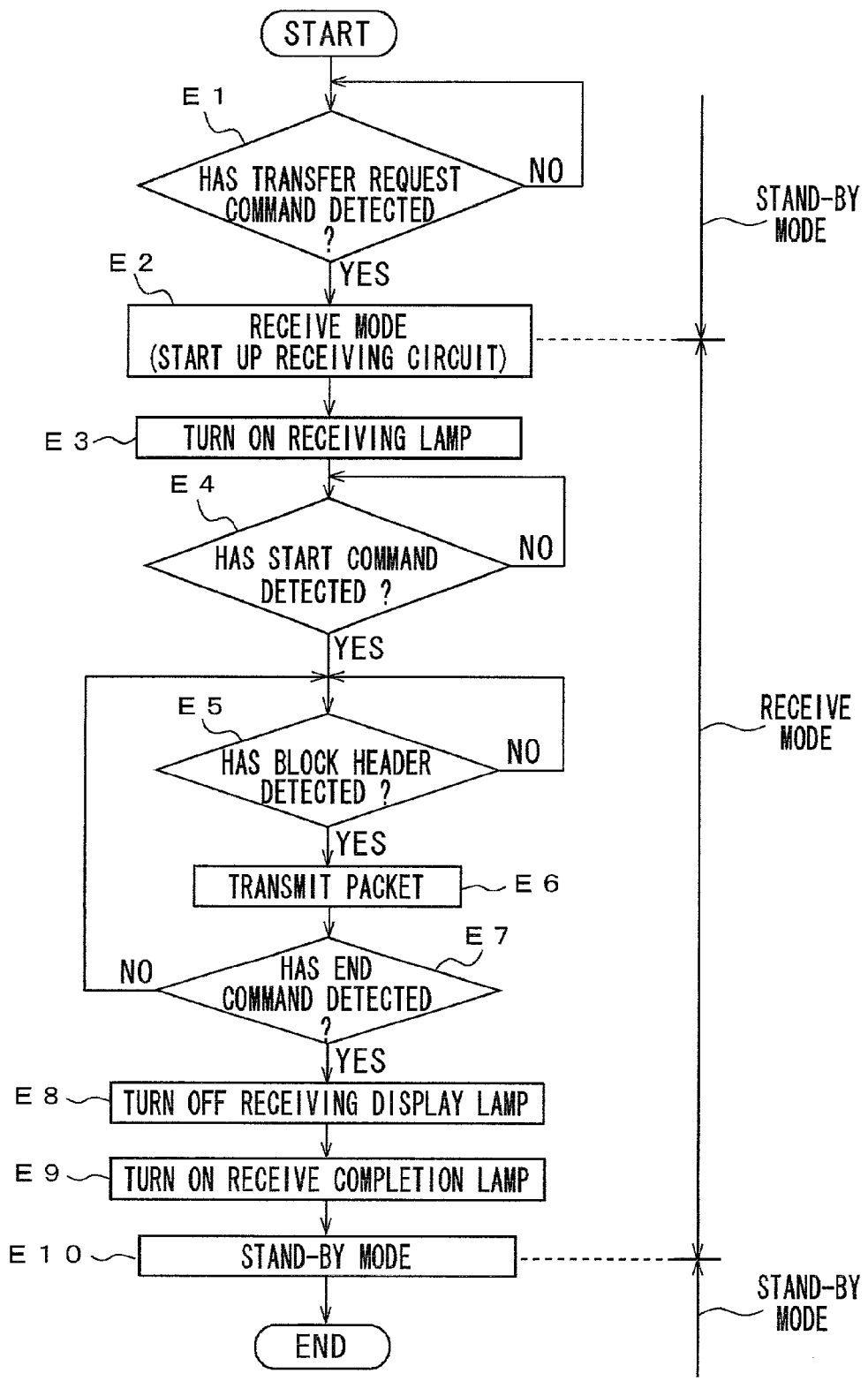
FIG. 9 is a flow chart showing an exemplary operation of a tuner apparatus 24 in a pocket theme park system 101.

Next, an exemplary processing performed in the pocket theme park system 101 will be described. FIG. 9 is a flow chart showing an exemplary operation of the tuner apparatus 24 in the pocket theme park system 101.

In this example, the electronic guide information D1 about the theme park is converted into data strings. The resultant data strings are distributed to information users from the broadcast station 9. The guide information means detailed descriptive information, which has been produced by the information provider, about the attractions and restaurants of the theme park, and software (i.e. data) such as the map information in the vicinity thereof.

In this example, in the state where the portable terminal apparatus 14 is set to the tuner apparatus 24 and is waiting for the data to be downloaded therein, the tuner apparatus 24 is in a stand-by mode. The stand-by mode means a state where the system LSI such as the microcomputer 70 and the LCDC 88 of the portable terminal apparatus 14 are turned off, except for the interface function with the microcomputer 90 of the tuner apparatus 24 and the clock function.

This interface function is also in the state where, unlike a normal data transmission, a start command from the microcomputer 90 can be polled at the lowest required rate. In the tuner apparatus 24, in order to detect a transmission request command, power is supplied from the power supplying circuit 80 to each of the sections. During this time, the secondary battery 87 is charged by the charge controlling circuit 85, because the portable terminal apparatus 14 is set to the tuner apparatus 24.

On the assumption described above, in Step E1 in the flow chart shown in FIG. 9, the transmission request command sent from the broadcast station 9 is detected in the tuner apparatus 24 in the stand-by mode. When the transmission request command is detected in the tuner apparatus 24, the transmission request command for announcing the initiation of the downloading is sent from the tuner apparatus 24 to the portable terminal apparatus 14. Then, in the portable terminal apparatus 14, the microcomputer 70 itself allows the portable terminal apparatus 14 to come up in Step E2 by use of the set-up period.

The receive mode means an intermediate mode between a stand-by mode and a normal mode (used usually). When the term of receive mode is used for the microcomputer 70, the receive mode means the state where, on top of the state where the stand-by function is turned on, a high-speed interface function with the tuner apparatus 24, and an external memory interface function for transmitting the data taken in the high-speed interface function to the data storage 75 such as a flash memory are further turned on. Therefore, at this time, power is supplied to the data storage 75 and the microcomputer 70 from the secondary battery 87.

After that, the procedure proceeds to Step E3 where the receive display lamp 37 for indicating the state where the receipt of the data strings is going on is turned on by the microcomputer 90 of the tuner apparatus 24. The charge display lamp 36 is turned on, because the portable terminal apparatus 14 is set to the tuner apparatus 24. The portable terminal apparatus 14 is in the state of waiting for receiving the program start command from the tuner apparatus 24.

Then, in Step E4, the microcomputer 90 detects whether or not the program start command is written for the data strings which are subsequent to the set-up period. This program start command is a signal for announcing that the transmission of all the programs downloaded at a time is started. The data of all the programs is divided into plural blocks, as has been described with reference to FIG. 7. Therefore, when the program start command is received (i.e. detected), the procedure proceeds to Step E5 where it is detected whether or not the block header is written in the packet of the first (i.e. leading) block 0.

When the block header is detected, the procedure proceeds to Step E6 where the packet transmission processing is performed for the packet-shaped group of data finely divided within the block in the state of handshaking with the microcomputers 70, 90. In other words, when the data strings are received in the tuner apparatus 24, the data decoding circuit 58 decodes the data strings into binary data.

Then, the electronic guide information D1 about the pocket theme park as a decoded data file is transmitted to the flash memory 33 and is temporarily stored therein. In this example, the decoded data file is transmitted to the flash memory 33 and the storage 75 of the portable terminal apparatus 14 simultaneously. Due to this structure, even in the case where the information user has missed to set the portable terminal apparatus 14 to the tuner apparatus 24, it is possible to retransmit the data file from the tuner apparatus 124 to the portable terminal apparatus 14 after receiving the data file.

At the last position of the packet, an end flag for indicating the end of this block is written. When the microcomputer 70 acknowledges the end flag, the procedure proceeds to Step E7. In Step E7, it is detected whether or not the program end command is written next to the end flag of the packet. When no program end command is detected, the procedure returns to Step E5 where it is further detected whether or not the next block header is written.

In such a manner described above, the data file is successively transmitted from the tuner apparatus 24 to the data storage 75 until the program end command is detected. When all the data strings are temporarily recorded in the flash memory 33 or the data storage 75 in accordance with the buffer memory within the microcomputer 70, the procedure proceeds to Step E8. In Step E8, the receive display lamp 37 of the tuner apparatus 24 is turned off by the microcomputer 90. When receiving the program end command, the microcomputer 70 turns off an indicator 47 of the portable terminal apparatus 14 of the portable terminal apparatus 14 for indicating the state where the data receiving is going on.

After that, the procedure proceed to Step E9 where the receive completion lamp is flashed at each of the tuner apparatus 24 and the portable terminal apparatus 14. The receive display lamp 37 or the indicator 47 for indicating the state where the data receiving is going on may be also used as the receive completion lamp. Then, the procedure proceeds to Step E10 where this portable terminal apparatus 14 is put into the stand-by mode.

Figure 10A:
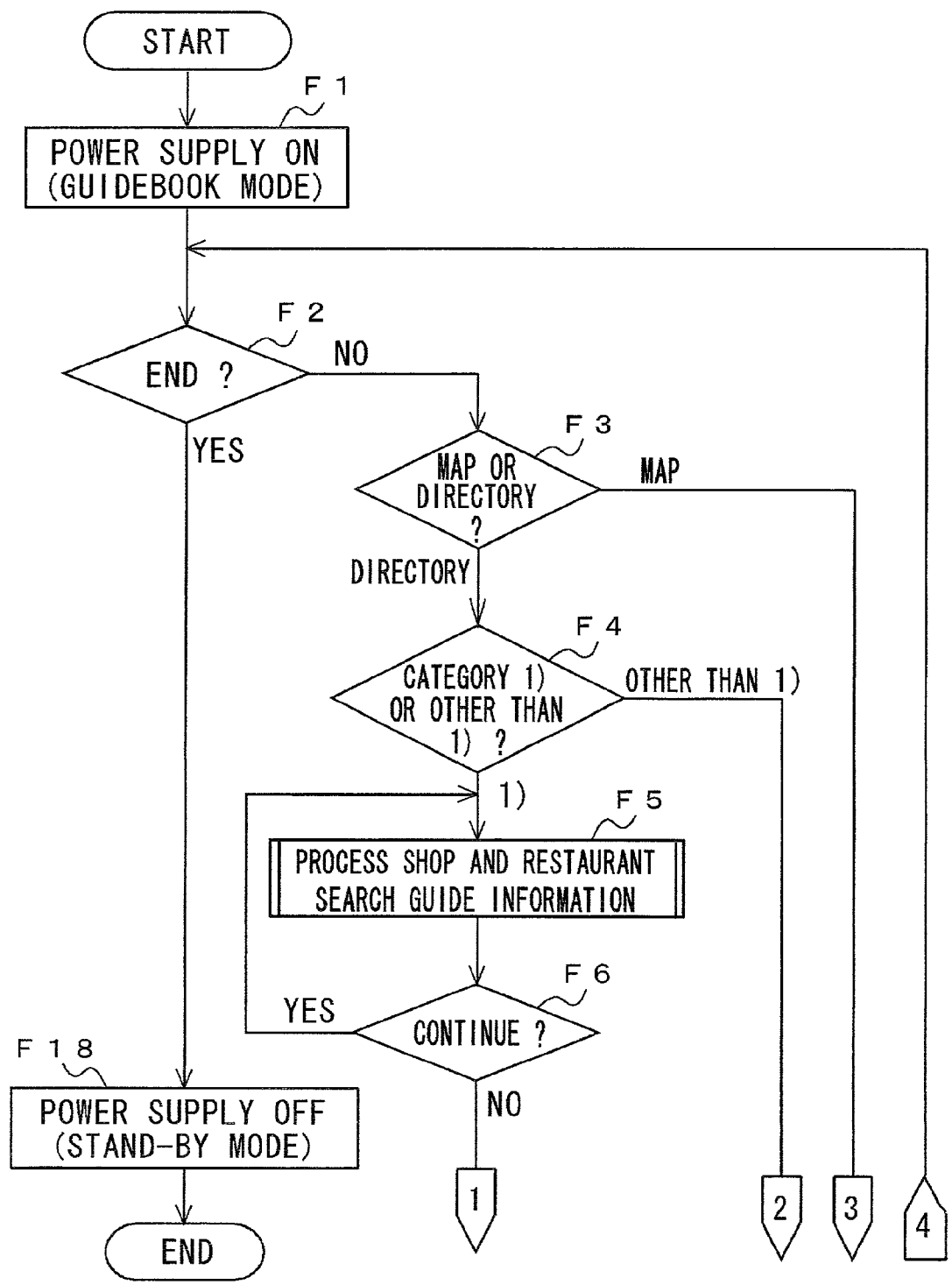
FIGS. 10A and 10B are the flow chart showing an exemplary processing performed at the time when a guidebook mode is selected in a portable terminal apparatus 14.
Figure 10B:
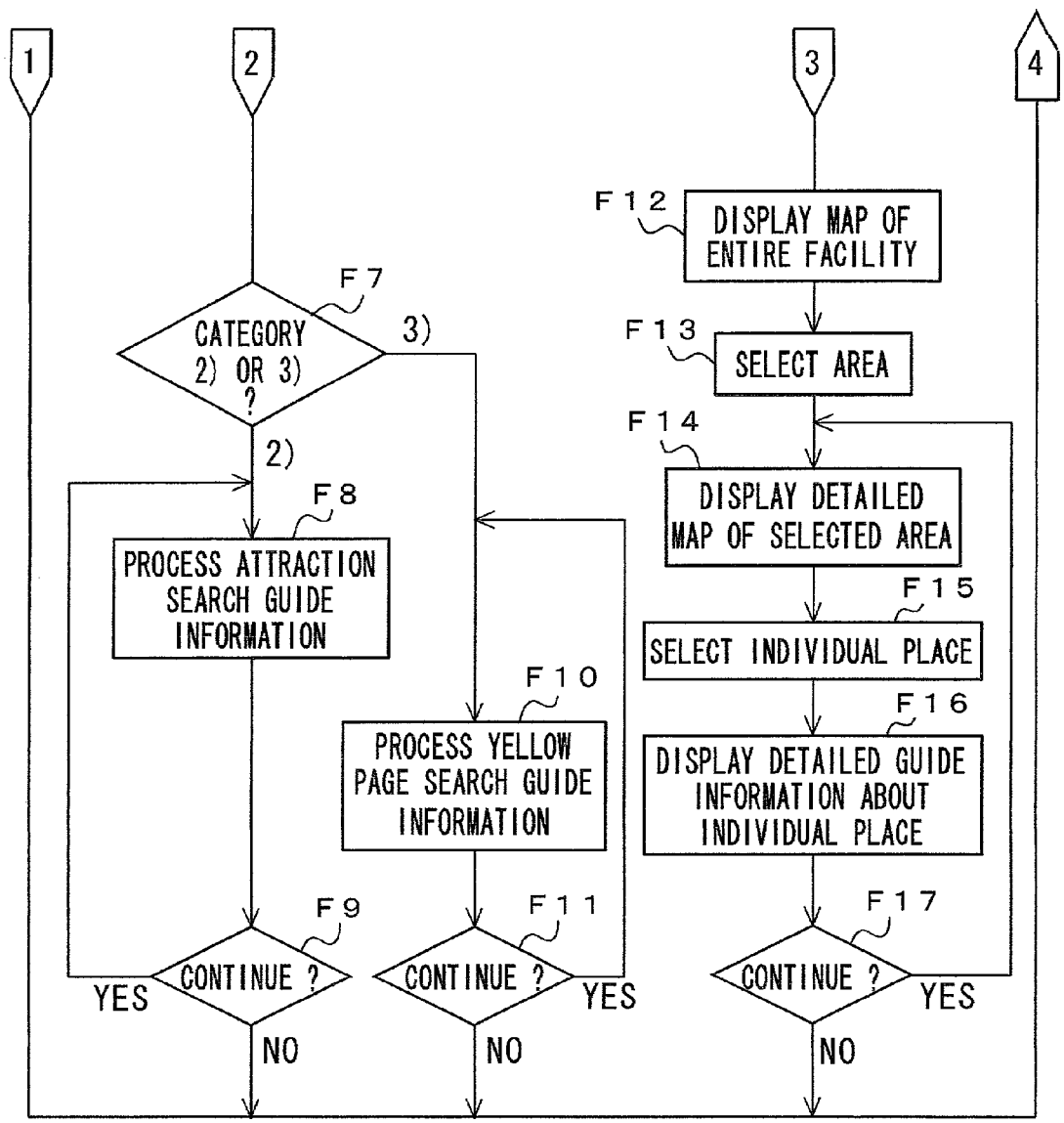

Next, an exemplary processing performed at the time when a guidebook mode is selected in the portable terminal apparatus 14 will be described. FIGS. 10A and 10B are flow charts respectively showing exemplary processing performed at the time when the guidebook mode is selected in the portable terminal apparatus 14.

In this example, description will be made on an assumption that the customers attracting facility is a theme park. In addition, description will be made on an assumption that the searching is performed in such a manner that either one of the means of performing a search in the list of places such as attractions, shops, and restaurants, or the means of performing a search in a map of the entire theme park or a detailed area map, and then information selection candidates in a lower hierarchy are successively traced. Obviously, at the time of visiting the theme park, the information user removes the portable terminal apparatus 14 from the tuner apparatus 24, and carries the portable terminal apparatus 14.

This exemplary processing will be described by taking a case as an example where the guidebook mode is selected at the same time when the power supply is turned on. The guidebook mode for the theme park includes the processing of selecting the map or directory based on the electronic guide information D1, and the processing of searching the categories placed at lower hierarchies in this directory.

In this example, three categories are prepared. That is, 1) a shop and restaurant search guide information processing; 2) an attraction search guide information processing; and 3) a yellow page search guide information processing, and the like are prepared. In each of the information processings, the following items are displayed as lower hierarchies thereof: a list of all the shops are displayed in an alphabetical order; a choice of searching policy is displayed; individual shops are displayed in such a manner as to meet the selected policy; detailed guide information of individual shops are displayed.

When the guide mode is selected, the microcomputer 70 in the portable terminal apparatus 14 reads the electronic guide information D1 from the data storage 75 in an asynchronous manner, in accordance with the information manipulation by the information user. At the same time, the electronic guide information D1 is controlled to be visually displayed or/and audibly output.

On the assumption described above, the power supply is turned on in the portable terminal apparatus 14 in Step F1 in the flow chart shown in FIG. 10A. As a result, the guidebook mode is selected. By the selection of the guidebook mode, a menu and the like is displayed on the liquid crystal display monitor 122. After that, the procedure proceeds to Step F2 where it is decided whether or not the guidebook mode should be terminated. In this example, since the guidebook mode is performed, the procedure proceeds to Step F3. In Step F3, either one of the map or the directory is selected.

At this time, the microcomputer 70 reads the electronic guide information D1 from the storage 75 in accordance with the manipulation information D3 by the manipulation key 32. At the same time, information processing is performed for the electronic guide information D1 to attain image display control. A cursor is displayed on the liquid crystal display monitor 122 in accordance with the manipulation information D3, and selection and decision is made on the decision key 30. When the directory is selected, the procedure proceeds to step F4. When the map is selected, the procedure proceeds to Step F12.

When the directory is selected first, in Step F4, it is waited until either one of the following categories is selected: 1) a shop/restaurant search and guide information processing; or 2) a search and guide information processing other than the processing 1). When the information user selects the category 1), the shop/restaurant search and guide information processing is performed. For example, the subroutine shown in FIG. 11 is called, and in Step G1 thereof, the list of all the shops is displayed in an alphabetical order by default.

After that, the procedure proceeds to Step G2 where a searching policy is selected. Choices of the searching policy include: a search in an alphabetical order by default; a search in the lower hierarchies thereof on an area-by-area basis; a search on a genre-by-genre basis; a search on a price zone-by-price zone basis ranging from luxury shops to self-service shops; and a search on a style-by-style basis such as show styles. When the search policy is selected, the procedure proceeds to Step G3 where the list of the shops is displayed in such a manner as to meet the selected policy. Then, the procedure proceeds to Step G4 where the specific shop is selected. After that, the procedure proceeds to Step G5 where detailed guide information about the specific shop and the like is displayed Then, the procedure proceeds to Step G6 where it is determined whether or not the processing of searching guide information should be continued. At this time, the determination is made by the information user. When it is determined to continue the search of the guide information, the procedure returns to Step G2 where the search is repeated. When it is determined to terminate the search of the guide information, the procedure returned to Step F5 in the main routine. After that, the procedure proceeds to Step F6 where it is determined whether or not the shop/restaurant search and guide information processing 1) should be continued. At this time, the determination is made by the information user. When it is determined to continue the search and guide information processing, the processing returns to step F5 where the information processing is repeated. When it is determined to terminate the search and guide information processing 1), the procedure returns to Step F2.

When a category other than the search and guide information processing 1) is selected in Step F4, the procedure proceeds to Step F7. In Step F7, it is waited until either one of 2) an attraction search guide information processing; and 3) a yellow page search guide information processing is selected. When the information user selects the category 2), the procedure proceeds to Step F8 where the attraction search and guide information processing is performed. Then, the procedure proceeds to Step F9 where it is determined whether or not the attraction search and guide information processing 2) should be continued. At this time, the determination is made by the information user. When it is determined to continue the search and guide information processing 2), the procedure returns to Step F8 where the information processing is repeated. When it is determined to terminate the search and guide information processing 2), the procedure returns to Step F2.

On the other hand, when the information user selects the category 3) in Step F7, the procedure proceeds to Step F10 where the yellow page search and guide information processing is performed. Then, the procedure proceeds to Step F11 where it is determined whether or not the yellow page search and guide information processing 3) should be continued. At this time, the determination is made by the information user. When it is determined to continue the search and guide information processing 3), the procedure returns to Step F10 where the information processing is repeated. When it is determined to terminate the search and guide information processing 3, the procedure returns to Step F2.

When the map is selected in Step F3, the procedure proceeds to Step F12 where the map of the entire theme park is displayed. After that, the procedure proceeds to Step F13 where an area about the theme park, such as AA land, BB land, and the like is selected. Then, the procedure proceeds to Step F14 where the detailed map of the selected area is displayed. In this case, the microcomputer 70 performs control such that the electronic guide information D1 is processed to display an image and the like of the theme park made of a three-dimensional image. After that, the procedure proceeds to Step F15 where an individual place is selected. Then, the procedure proceeds to Step F16 where detailed guide information about the individual place and the like is displayed.

After that, the procedure proceeds to Step F17 where it is determined whether or not the processing of displaying the detailed guide information about the individual place should be continued. At this time, the determination is made by the information user. When it is determined to continue the processing of displaying the detailed guide information, the procedure returns to Step F14 where the detailed map of the specific area is displayed. When it is determined to terminate the processing of displaying the detailed guide information of the individual place, the procedure returns to Step F2. In Step F2, it is determined whether or not the processing of displaying the detailed guide information about the individual place should be terminated. At this time, the portable terminal apparatus 14 detects the information about the state where the power supply has been turned off, and then, is put into the stand-by mode in Step F18.

As has been described above, in the pocket theme park system 101 in the first example according to the present invention, when the electronic guide information D1 about the theme park is processed, the information user can obtain the electronic guide information D1 in the form of electronic book information, instead of paper materials in conventional forms such as guidebooks and guide maps.

Furthermore, this system employs a method in which the electronic guide information D1 is distributed at a time by use of a broadcasting or communication infrastructure. In this manner, the information user can easily and timely obtain the guide information about the theme park and the like before he or she actually visits there.

In addition, after receiving the electronic guide information D1, the information user can freely read the electronic guide information D1 about the theme park in an unreal time manner (i.e. in an asynchronous manner), so as to see or listen to the video or audio information about the theme park or the event hall. When new theme parks or event halls are constructed, or there are changes in attractions, the user can timely obtain such information.

(4) Second Example

FIG. 12 is an image diagram showing an exemplary structure of a pocket theme park system 102 in a second example according to the present invention.

In this example, a portable telephone 401 with tuner function is used as a portable terminal apparatus. The electronic guide information D1 about the theme park and the like is directly downloaded into the portable terminal apparatus. Obviously, when the portable terminal apparatus is used, a memory card 203 into which the electronic guide information D1 about a theme park, provided by use of an already-existing sales infrastructure, is mounted to the portable terminal apparatus.

When the electronic guide information D1 about the theme park is distributed by use of the memory card 203, the portable terminal apparatus may be separated from the broadcasting or communication infrastructure. In this case, the electronic guide information D1 is commercially sold as a package medium. The information user purchases the electronic guide information as a package medium as if he or she purchases a guidebook as a bookstore.

When used, the memory card 203 is mounted to the portable terminal apparatus or the portable telephone 401. The above-described software distribution style is the same as those for conventional music CDs and video game software programs. Alternatively, the memory card 203 may be distributed at no charge at shops or in towns.

In this manner, as compared with paper materials in conventional forms such as guidebooks and guide maps, the portable terminal apparatus and the portable telephone 401 have enhanced operability and searchability as guidebooks. Therefore, the use of the portable terminal apparatus and the portable telephone 401 afford remarkably increased convenience especially at the theme park and event hall when the user actually visits there.

Figure 13:
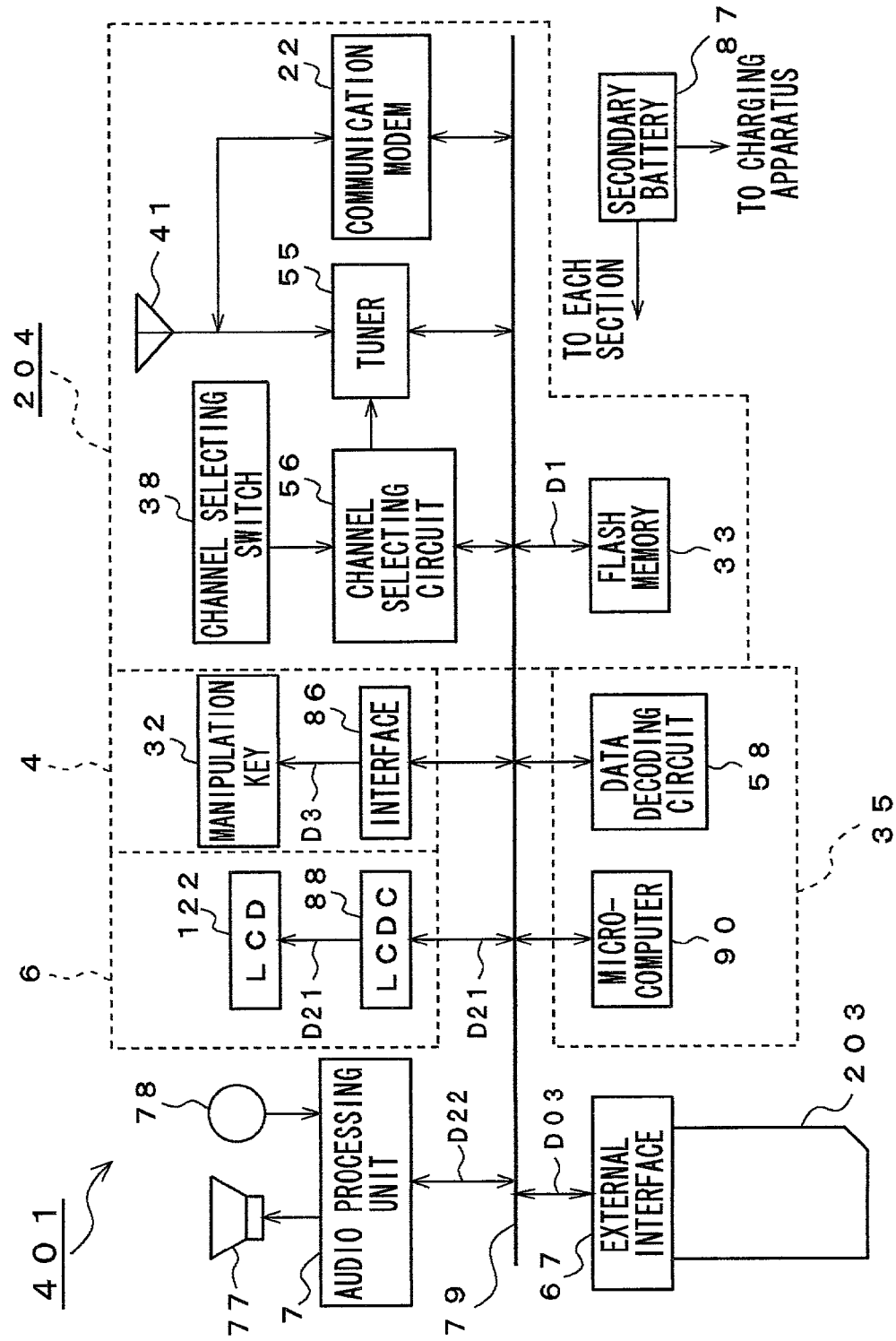
FIG. 13 is a block diagram showing an exemplary inner structure of a portable telephone 401.

Next, an exemplary inner structure of the portable telephone 401 with tuner function will be described. FIG. 13 is a block diagram showing an exemplary inner structure of the portable telephone 401. The constituent element denoted by the same reference numerals and having the same names have the same functions as of the portable terminal apparatus 14, and therefore, their descriptions will be omitted.

The portable telephone 401 in FIG. 13 is an example of the portable terminal apparatus. The portable telephone 401 processes the electronic guide information D1 provided from the broadcast station 9, the electronic guide information D1 and the game data D03 provided from the memory card 203, and has a system bus 79. To the system bus 79, connected are a manipulation section 4, a displaying section 6, an audio processing section 7, a data processing section 35, an external interface 67, a receiving section 204 and the like. These are driven by a secondary battery 87.

To this eternal interface 67, a memory card 203 is mounted. In the memory card 203, electronic guide information D1 about a theme park produced by an information provider is stored. As the memory card 203, a nonvolatile memory such as a flash memory is used. The receiving section 204 includes a tuner 55, a communication modem 22, a channel selecting switch 38, a channel selecting circuit 56, and a flash memory 33. The electronic guide information D1 about the theme park is received from the tuner 55. Data such as decoded video and audio information, the electronic guide information D1, program information D2 and the like is stored in the flash memory 33.

In this example, the data processing section 35 includes a data decoding circuit 58 and a microcomputer 90. The data processing section 35 has, on top of a normal telephone function, additional functions of reading the electronic guide information D1 stored in the flash memory 33 and then processing it, as well as of processing the electronic guide information D1 and the game data D03 after the memory card 203 is mounted.

To the system bus 79, an interface (I/F) 86 constituting the manipulating section 4 is connected. To the interface 86, the manipulation key 32 is connected. The manipulation key 32 is manipulated in order to control the data decoding circuit 58 and the microcomputer 90.

Furthermore, to the system bus 79, connected is a liquid crystal display controller 88 (LCDC) constituting the displaying section 6. To the controller, a liquid crystal display monitor 122 is connected so as to display an image such as a map of the theme park based on the video information D21. In this example as well, data strings multiplexed in a vertical blanking period of a data broadcasting signal employed by a broadcast station 9 are received by the tuner 55. The data strings are then downloaded in the flash memory 33.

The audio processing section 7 performs reproduction, amplification and the like for the audio information D22 about the electronic guide information D1, and then outputs an audio signal to the speaker 77. When the telephone function is selected, the audio processing section 7 serves as a telephone. To the audio processing section 7, a microphone 78 is connected. The microphone 78 serves as a transmitter when the telephone function is connected.

The communication modem 22 is connected to a wireless base station, the internet, a telephone line, a satellite line, and the like. Data is received through these communication lines when a normal telephone function is performed, the electronic guide information D1 is downloaded by use of an already-existing communication infrastructure, or charged contents are settled. A group of data strings which has been received by the communication modem 22 is temporarily stored in the flash memory 33.

Figure 14:
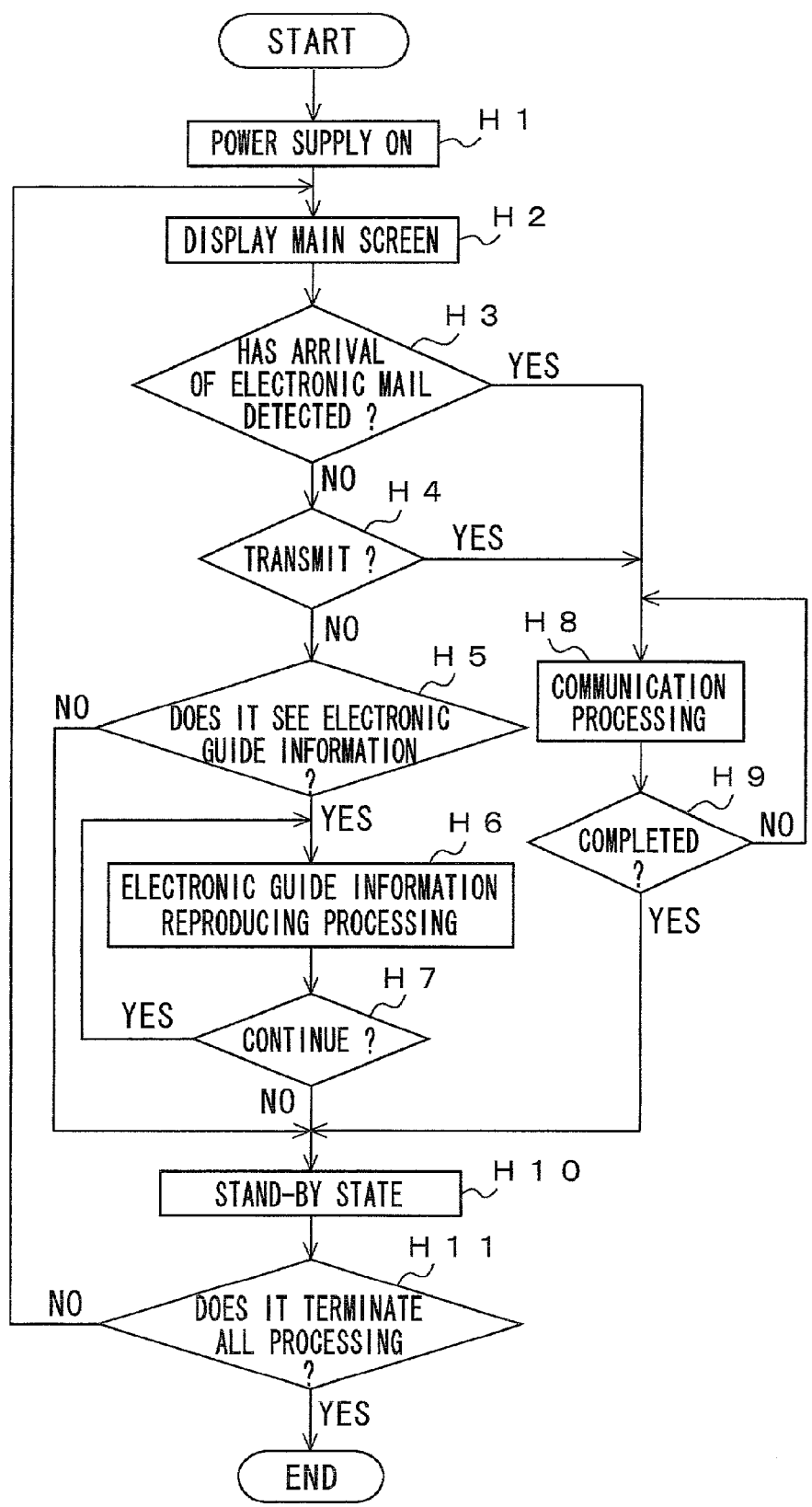
FIG. 14 is a flow chart showing an exemplary processing in a portable telephone 401.

Next, an exemplary processing performed in the portable telephone 401 in the pocket theme park system 102 will be described. FIG. 14 is a flow chart showing an exemplary processing in the portable telephone 401.

In this example, description will be made on an assumption that the memory card 203 in which the electronic guide information D1 about a theme park or an event hall is recorded beforehand has been already mounted to the portable telephone 401. In addition, description will be made on an assumption that, when new theme parks or event halls are constructed, or there are changes in attractions, such information is downloaded into the flash memory 33 through the tuner 55.

On the assumption described above, when the power supply of this portable telephone 401 is turned on in Step H1 in the flow chart shown in FIG. 14, the procedure proceeds to Step H2 where a main screen is displayed on the liquid crystal display monitor 122.

Then, the procedure proceeds to Step H3 where the liquid crystal display monitor 122 displays whether or not an electronic mail and the like has arrived. The information user checks the display on the monitor 122. When there is arrival of an electronic mail and the like, the procedure proceeds to Step H8 where a communication processing is performed with a server and the like of a communication company via a communication modem 22 and the like. After that, the procedure proceeds to Step H9 where the microcomputer 90 detects whether or not the communication processing has been completed. When the communication processing is not still completed, the communication processing of Step H8 is continued. When the microcomputer 90 detects a communication end signal, the communication processing is terminated.

When there is no arrival of an electronic mail and the like in Step H3, the procedure proceeds to Step H4. In Step H4, the liquid crystal display monitor 122 displays whether or not a transmission should be made from this portable telephone 401 to the terminal apparatus of the partner. When the transmission is made to the partner, the procedure proceeds to Step H8 where a communication processing is performed. After that, the procedure proceeds to Step H9 where the completion of the communication processing is detected. Then, the procedure proceeds to Step H10.

When no transmission is made to the partner in Step H4, the procedure proceeds to Step H5 where the main screen displays whether or not to see the electronic guide information D1. When the electronic guide information D1 is not seen, the procedure proceeds to Step H10. When the electronic guide information D1 is seen in Step H5, the procedure proceeds to Step H6 where the electronic guide information D1 is reproduced. The electronic guide information D1 is constituted by data such as decoded video or audio information and program information D2, and such data is read from the memory card 203 by the microcomputer 90. When new theme parks or event halls are constructed, or there are changes in attractions, such information is read from the flash memory 33.

Then, when the information user manipulates the manipulation key 32, the microcomputer 90 is instructed to perform control based on the manipulation information D3 made by manipulating the manipulation key 32. At the same time, the liquid crystal monitor 122 is operated to display the electronic guide information D1 based on the video information D21. The audio processing section 7 performs reproduction and amplification for the audio information D22 of the electronic guide information D1, and then outputs an audio signal to the speaker 77.

After that, the procedure proceeds to Step H7 where it is determined whether the reproduction of the electronic guide information D1 should be continued or terminated. When the reproduction is terminated, the procedure proceeds to Step H10. In Step H10, this portable telephone 401 is put into a stand-by state. Then, the procedure proceeds to Step H11 where it is determined whether or not all the processings should be terminated. When all the processings are not terminated, the procedure returns to Step H2 where the liquid crystal display monitor 122 is operated to display a main screen. When all the processings are terminated, it is detected that the information about the state where the power supply has been turned off. Then, the control in this portable telephone 401 is terminated.

As has been described above, in the pocket theme park system 102 in the second example according to the present invention, when the electronic guide information D1 about the theme park and the like is processed, the portable terminal apparatus telephone 401 with tuner function is employed. Before actually visiting the theme park, the information user downloads the electronic guide information D1 beforehand by the tuner 55 of the portable telephone 401. Alternatively, the information user obtains the memory card 203 from an already-existing sales infrastructure, thereby performing data processing for the electronic guide information D1.

Furthermore, after receiving the electronic guide information D1, the information user freely reads the guide information about the customers attracting facility in an unreal time manner (i.e. in an asynchronous manner), so as to see or listen to the video or audio information about the theme park or the event hall. When new theme parks or event halls are constructed, or there are changes in attractions, the information user can timely obtain such information.

(5) Third Example

Figure 15:
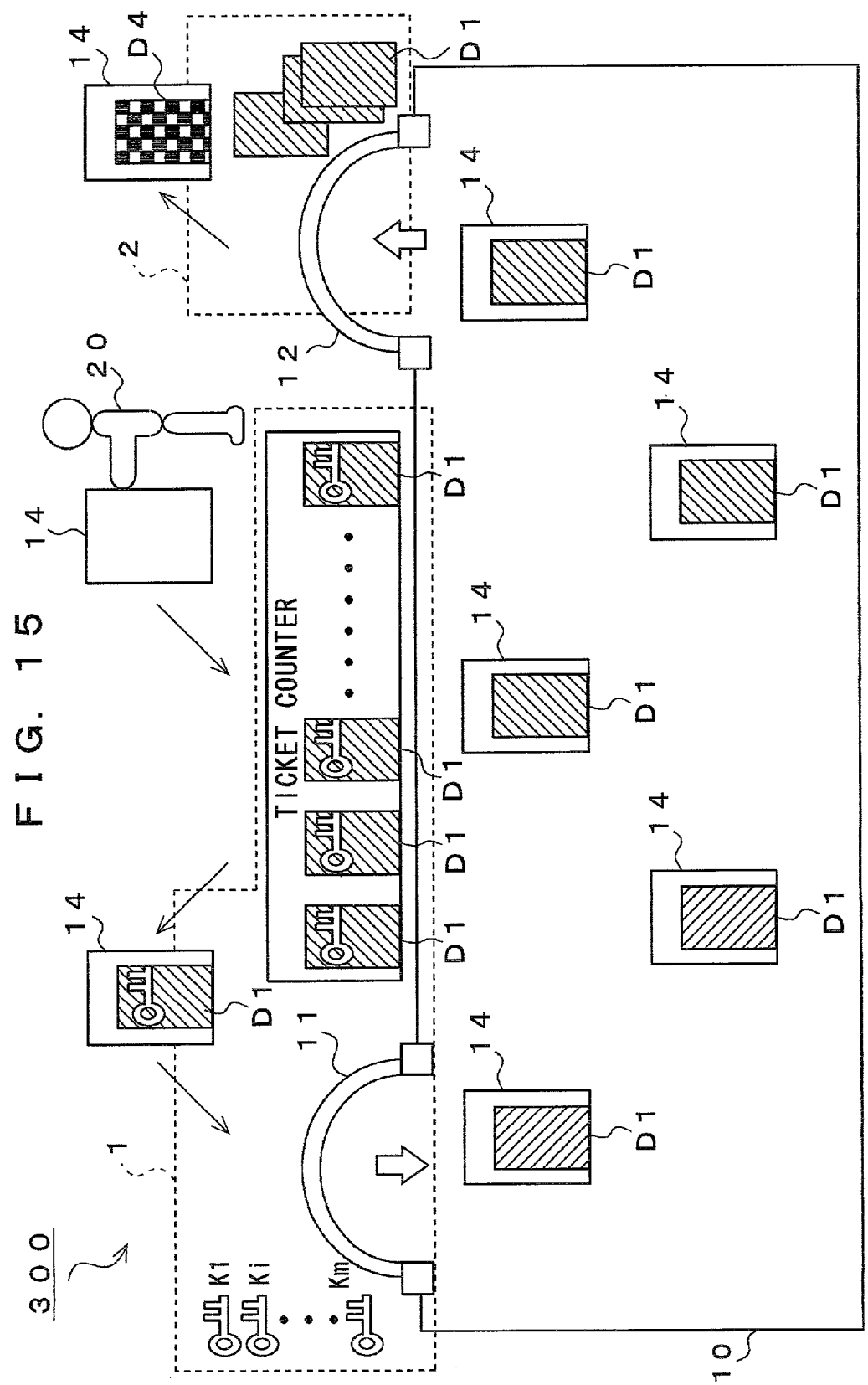
FIG. 15 is an image diagram showing an exemplary structure of a pocket theme park system 300 in a third example according to the present invention.

FIG. 15 is an image diagram showing an exemplary structure of a pocket theme park system 300 in a third example according to the present invention.

The pocket theme park system 300 shown in FIG. 15 is a system for processing electronic guide information D1 about a theme park 10 such as a zoo and an amusement park which restricts the customers to go in and out only through its entrance 11 and exit 12. In this example, the information user who visits a theme park 10 shown in FIG. 15 (hereinafter, simply referred to as a visitor 20) goes to a ticket counter (i.e. a sales spot) with the portable terminal apparatus 14, so as to purchase his or her desired ticket.

At this time, the electronic guide information D1, which is guide information of the theme park, is transmitted to the portable terminal apparatus 14 at the ticket counter, by use of an unillustrated terminal apparatus (i.e. a downloader) for ticket sales window. The electronic guide information D1 is downloaded in a data storage 75 and the like of the portable terminal apparatus 14, which has been already described above with reference to FIG. 8. The electronic guide information D1 downloaded at the window is encrypted (i.e. protected) by use of a secret key. Therefore, even if the visitor takes the portable terminal apparatus 14 out of the theme park 10 without entering there after the electronic guide information D1 is downloaded, it is impossible to utilize the downloaded electronic guide information D1.

Then, the visitor 20 receives decryption by a secret key at an entrance 11 of the theme park 10, and as a result of this, is permitted to enter in the theme park 10. In this manner, the visitor can freely utilize the downloaded electronic guide information D1 in the theme park. When the visitor 20 is leaving for the theme park, the electronic guide information D1 is erased at an exit 12. At the same time of erasing the electronic guide information D1, visit record information D4 is saved as the use information on that day. The visitor 20 can take the visit record information as a memento.

Figure 16:
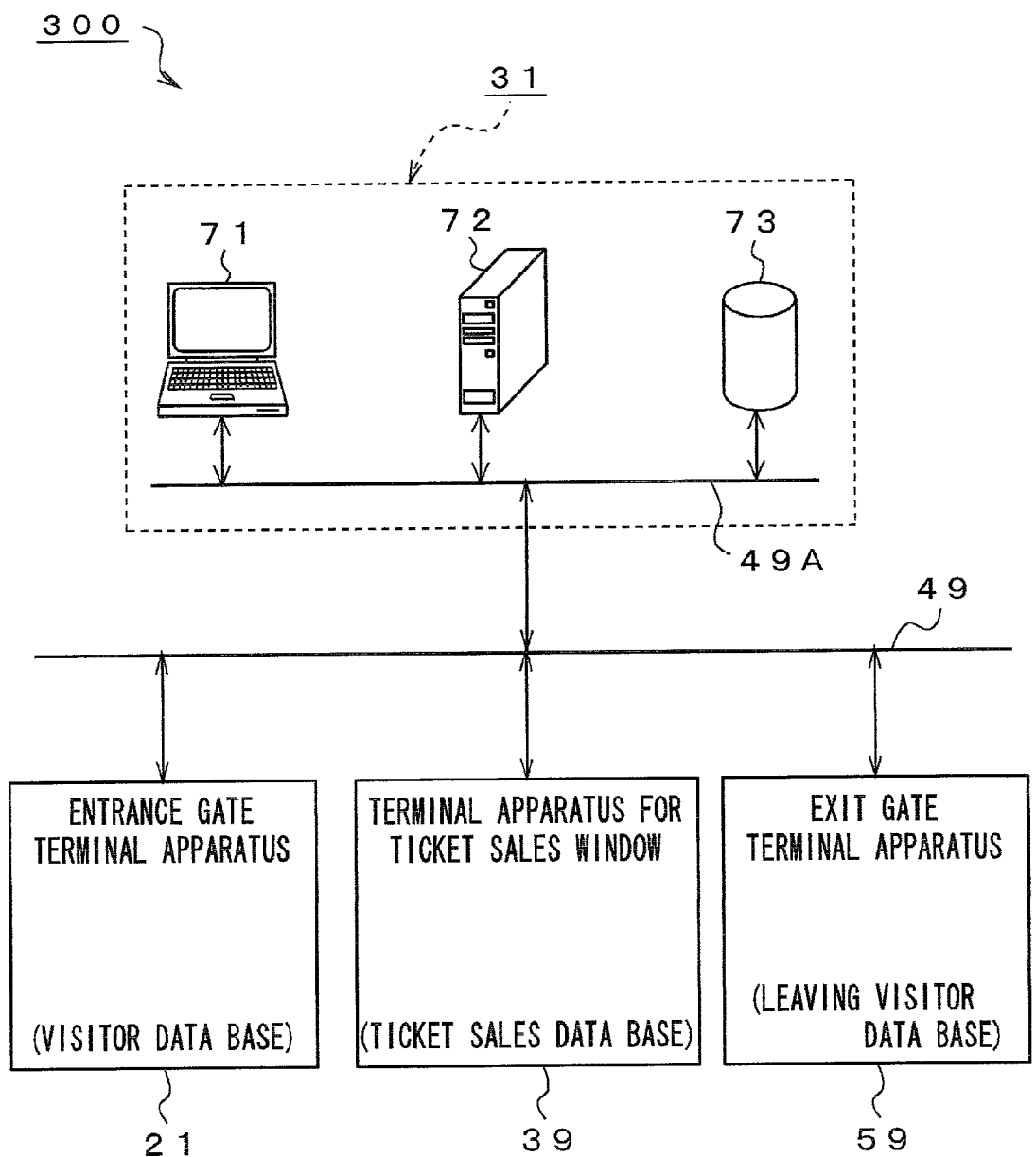
FIG. 16 is a block diagram showing an exemplary control in a pocket theme park system 300.

An exemplary control performed in the pocket theme park system 300 on the assumption described above is shown in FIG. 16. The pocket theme park system 300 shown in FIG. 16 includes an entrance gate terminal apparatus 21 as an example of an information lending apparatus, and a terminal apparatus 39 for ticket sale window. The terminal apparatus 39 is provided with a sales ticket data base in which the electronic guide information D1 encrypted beforehand is stored. At this time, the encryption is performed by locking (i.e. encrypting) the electronic guide information D1 with a secret key. When there is no key code Ki (i=1 to m) which corresponds to the secret key, it is impossible to decipher the electronic guide information D1. The terminal apparatus 39 also records the number of sold tickets.

The electronic guide information D1 downloaded in this example is guide information including detailed descriptive information, which has been produced by the information provider, about the attractions and restaurants in the theme park. The electronic guide information D1 includes dedicated program information D2 controllable by the microcomputer 70. By processing the electronic guide information D1 based on the program information D2, it becomes possible to comfortably search and display various kinds of guide information by the portable terminal apparatus 14.

In addition, an entrance gate terminal apparatus 21 is located in the vicinity of the entrance of the theme park 10 shown in FIG. 15. The entrance gate terminal apparatus 21 is connected to the terminal apparatus 39 for the ticket sales window described above through a dedicated communication line 49 such as LAN. The entrance gate terminal apparatus 21 is operated to decrypt the electronic guide information D1 downloaded in the portable terminal apparatus 14. The decrypting made at this time can be released by use of a secret key (key code Ki). As a result of this, the reading of the electronic guide information D1 from the portable terminal apparatus 14 is permitted at the entrance 11. Both the terminal apparatuses 14 and 21 may be physically connected to each other by use of a dedicated connector, or alternatively, may be connected to each other by use of a short distance wireless communication function such as infrared rays.

The secret key establishes a correspondence between the terminal apparatus 39 and the entrance gate terminal apparatus 21, and is continuously changed in an arbitrary period (every week, every day, in the morning and afternoon, every 3 hours, or at random). This arrangement is made in order that, even if the visitor cannot see all the attractions performed on that single day when he or she visits it, the visitor can utilize this secret key again at the next visit. The entrance gate terminal apparatus 21 is provide with a visitor data base in which the number of visitors is recorded. The visitor 20 always carries the portable terminal apparatus 14 during the time when he or she stays in the theme park 10, and reproduces the downloaded electronic guide information D1.

To the communication circuit 49, connected is a theme park managing apparatus 31 which is an example of an information managing apparatus. The theme park managing apparatus 31 manages the entire pocket theme park system 300. The theme park managing apparatus 31 includes a personal computer 71, a server 72, and a data base 73. These are connected to each other by a system communication cable 49A in order to make it possible to properly perform maintenance for the electronic guide information D1 at the theme park side.

The electronic guide information D1 including a map and detailed descriptive information about the attractions and restaurants within the theme park is produced at the theme park management side beforehand by use of the personal computer 71. Thus-produced electronic guide information D1 is stored into the data base 73 by use of the server 72, or the electronic guide information D1 is read from the data base 73.

In the vicinity of the exit of the theme park 10, an output gate terminal apparatus 59, which is an example of an information collecting apparatus, is provided. The output gate terminal apparatus 59 collects the electronic guide information D1 which has been lent to the portable terminal apparatus 14. The output gate terminal apparatus 59 is connected to the theme park managing apparatus 31 through the communication line 49, so as to perform a processing of inhibiting the reading of the electronic guide information D1, downloaded in the portable terminal apparatus 14, at the exit 12. For example, the electronic guide information D1 is erased at the exit 12. Instead of forcible erasure, the erasure may be a time-limited erasure in which the electronic guide information D1 is automatically erased when the time the theme park is closed comes.

At the same time, a processing of writing information about use status of the theme park 10 by the visitor 20 and/or advertisement information about the theme park 10 into the portable terminal apparatus 14 is performed. The information about use status is written into the portable terminal apparatus 14 as visit record information D4. Into the visit record information D4, date and time when the visitor visits the theme park, a message from the theme park, as well as the historical evidence about the attractions and restaurants which the visitor has utilized are packed and added as a trail of the visitor 20. The visit record information D4 will be a memento of the visit 20, and the advertisement information has an effect for the information provider of attracting the visitor 20 again to the theme park.

Figure 17:
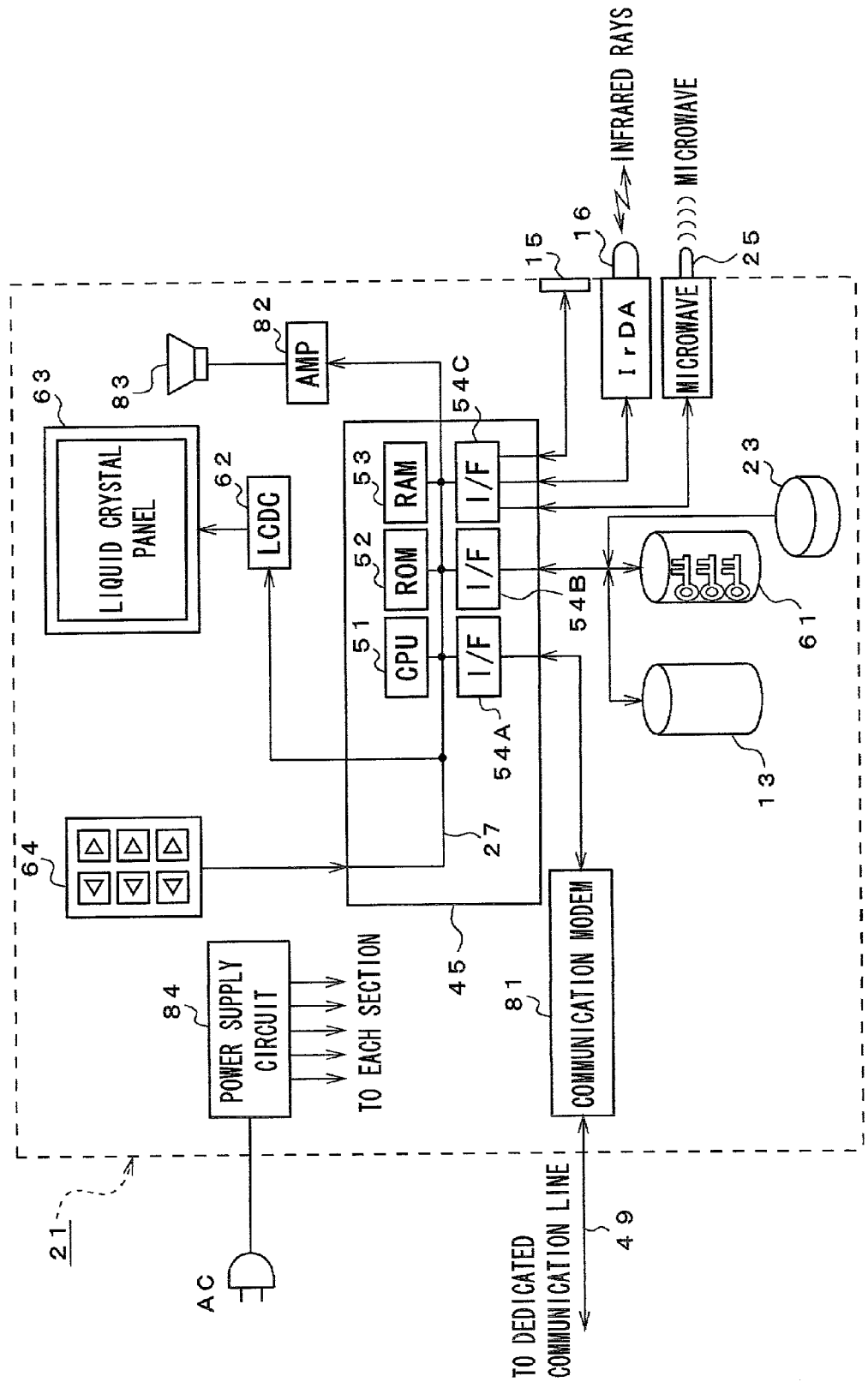
FIG. 17 is a block diagram showing an exemplary inner structure of an entrance gate terminal apparatus 21.

FIG. 17 is a block diagram showing an exemplary inner structure of an entrance gate terminal apparatus 21. The entrance gate terminal apparatus 21 shown in FIG. 17 is provided with a visitor data base 13 for recording the number of visitors and the time when each of the visitors has visited. The visitor data base 13 is connected to the personal computer board 45.

In the personal computer board 45, a CPU 51, a ROM 52, a RAM 53, and three interfaces (I/F) 54A to 54C are integrated. To the interface 54B, a release key data base 61 is connected, on top of the aforementioned visitor data base 13. In the release key data base 61, release key code information for decoding the electronic guide information D1 is stored. The release key code information may be managed on a time basis. For example, the electronic guide information D1 may be decrypted from the release key code information when the time the theme park is opened comes. As the visitor data base 13 and the release key data base 61 respectively, a fixed disc driving apparatus (HDD) having a predetermined storing capacity is used.

To the aforementioned interface 54B, a CD-ROM 23 is connected. An application software program and the like of the entrance gate terminal apparatus 21 is read from the CD-ROM 23, and then is installed into the release key data base 61 or the visitor data base 13. The application software program is temporarily stored in the RAM 53 connected to the system bus 27 through the interface 54B. To the system bus 27, a ROM 52 is connected. A control program for controlling the entrance gate terminal apparatus is read from the ROM 52. The application software program and the control program control the entire entrance gate terminal apparatus.

To the release key data base 61, a system bus 27 is connected through the interface 54B. To the system bus 27, a CPU 51 which is an example of the controlling apparatus is connected so as to control the input and output into or from the visitor database 13 ad the release key data base 61. For example, when the electronic guide information D1 about the theme park and the like is lent, the CPU 51 controls the electronic guide information D1, encrypted beforehand at the time when being downloaded, to be encrypted.

In this example, a communication modem 81 in a dedicated high-rate serial transmission mode is provided as an example of the communication means. The communication modem 81 performs a communication processing together with the theme park managing apparatus 31 for the electronic guide information D1. the communication modem 81 is connected to the theme park managing apparatus 31 via a dedicated communication line. To the aforementioned system bus 27, an interface 54C for portable terminal is connected so as to perform a communication processing with the portable terminal apparatus 14 which the visitor 20 carries.

To the interface 54C, a connector 15 for the portable terminal is connected. The portable terminal apparatus 14 is directly mounted to the connector 15. Ticket individual ID information and visit time (i.e. a time stamp) of the visitor 20 are read from the portable terminal apparatus 14 to this entrance gate terminal apparatus 21. The ID information and the visit time are recorded in the visitor data base 13. Release key information is supplied form the entrance gate terminal apparatus 21 to the portable terminal apparatus 14, and the electronic guide information D1 which has been downloaded at the window is decrypted. Obviously, a cable method in which a general-purpose cable such as USB is used may be employed. The structure employed in this example is not limited to the direct connection such as described above.

For example, an IrDA transmitting and receiving module 16 is connected to the interface 54C, so as to establish infrared ray communication with an IrDA transmitting and receiving section in the portable terminal apparatus 14. Furthermore, a microwave transmitting and receiving module 25 employing the Bluetooth (i.e. short distance wireless communication function) and the like is connected to the interface 54C. In this manner, wireless communication is performed between the portable terminal apparatus 14 and the entrance gate terminal apparatus 21 in the non-contact method.

A manipulation panel 64 is connected to the aforementioned PC board 45 for allowing the information provider to input the manipulation information D3. At this time, the manipulation information D3 is information for instructing a cooperating operation in this pocket theme park system 101. Furthermore, a liquid crystal display controller (LCDC) 62 is connected to the PC board 45. To the LCDC 62, connected is a liquid crystal panel 63 for displaying an image for giving a welcome to the visitor.

To the PC board 45, an amplifier (AMP) 82 is connected. In the amplifier 82, an audio signal for giving a welcome to the visitor and the like is amplified and then is output to the speaker 83. The visitor 20 can listen to the announcement (i.e. instruction) about a method for handling the portable terminal apparatus 14 at the time when he or she visits this theme park. Obviously, a power supply circuit 84 to be connected to AC power supply is provided to this entrance gate terminal apparatus 21, so as to supply power to each circuit section.

As described above, in the entrance gate terminal apparatus 21, the electronic guide information D1 downloaded in the portable terminal apparatus 14 can be decrypted. The decrypting made at this time can be released by use of a secret key (key code Ki). In this manner, the reading of the electronic guide information D1 from the portable terminal apparatus 14 is permitted at the entrance 11.

Figure 18:
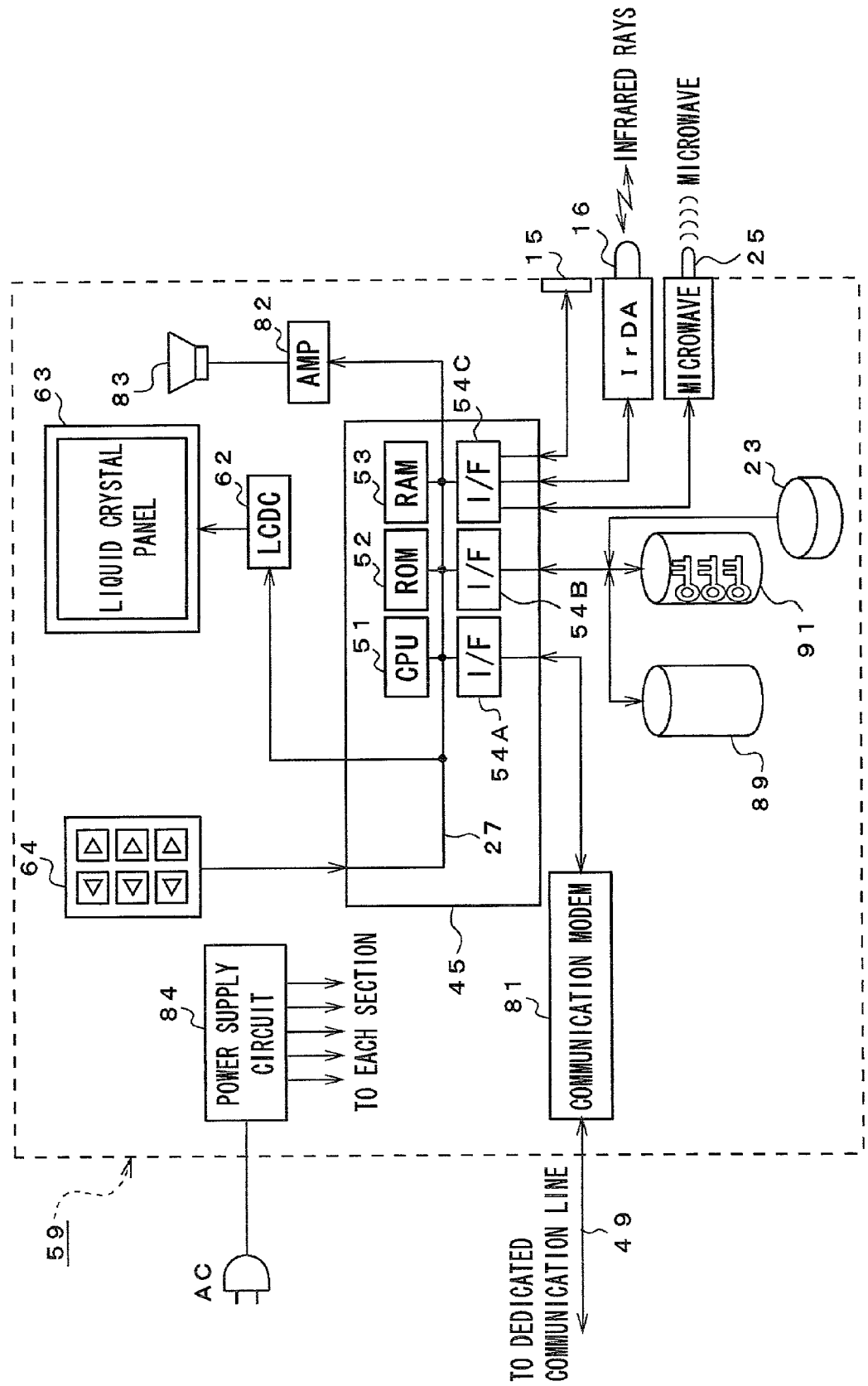
FIG. 18 is a block diagram showing an exemplary inner structure of an exit gate terminal apparatus 59.

FIG. 18 is a block diagram showing an exemplary inner structure of the exit gate terminal apparatus 59. The constituent elements denoted by the same reference numerals and having the same names have the same functions as those of the entrance gate terminal apparatus 21 shown in FIG. 17, and therefore, their descriptions will be omitted.

The exit gate terminal apparatus 59 shown in FIG. 18 includes a leaving visitor data base 89 into which the number of the visitors left from the theme park and the time when the each of visitors has left from the theme park. When the electronic guide information D1 about the theme park and the like is collected, the CPU 51 in the exit gate terminal apparatus 59 erases the electronic guide information D1. At the same time, the information about use status of the theme park by the visitor 20 and/or advertisement information about the theme park and the like is written in the data storage 75 of the portable terminal apparatus 14.

To the interface 54B of the exit gate terminal apparatus 59, an evidence release key data base 91 is connected on top of the visitor data base 89 described above. In the evidence release key data base 91, release key code information and advertisement information about this theme park and the like are stored. It is also possible to manage the release key code information on a time basis. For example, the electronic guide information D1 may be decrypted from the release key code information when the time the theme park is closed comes. As the visitor data base 89 and the evidence release key data base 91 respectively, a fixed disc driving apparatus (HDD) having a predetermined storing capacity is used.

To the aforementioned interface 54B, a CD-ROM 23 is connected. An application software program and the like of the exit gate terminal apparatus 59 is read from the CD-ROM 23, and then is installed into the evidence release key data base 91 or the leaving visitor data base 89. The application software program is temporarily stored in the RAM 53 connected to the system bus 27 through the interface 54B. To the system bus 27, a ROM 52 is connected. A control program for controlling the exit gate terminal apparatus is read from the ROM 52. The application software program and the control program control the entire exit gate terminal apparatus.

To the evidence release key data base 91, a system bus 27 is connected through the interface 54B. To the system bus 27, a CPU 51 is connected so as to control the input and output into or from the leaving visitor database 89 and the evidence release key data base 91. For example, when the electronic guide information D1 about the theme park and the like is collected, the CPU 51 of the exit gate terminal apparatus 59 erases the electronic guide information D1. At the same time, the information about use status of the theme park by the visitor 20 and/or advertisement information about the theme park and the like is written in the data storage 75 of the portable terminal apparatus 14.

To the interface 54C, a connector 15 for the portable terminal is connected. The portable terminal apparatus 14 is directly mounted to the connector 15. Ticket individual ID information and visit time (i.e. a time stamp) of the visitor 20 are read from the portable terminal apparatus 14 to this exit gate terminal apparatus 59. The ID information and the visit time are recorded in the leaving visitor data base 89. By comparing the number of visitors with the number of leaving visitors, it is possible to confirm whether or not visitors remain in the theme park. Information about use status of the theme park and the like by the visitor 20 and/or advertisement information about the theme park and the like are written from the exit gate terminal apparatus 59 into the portable terminal apparatus 14.

Furthermore, a liquid crystal display controller (LCDC) 62 is connected to the PC board 45. To the LCDC 62, connected is a liquid crystal panel 63 for displaying an image for giving an appreciation for the visit on that day, and an image for asking the visitor to visit there again in future. The visitor 20 can listen to the announcement (i.e. instruction) about his or her visit to this theme park from the speaker 83.

Figure 19:
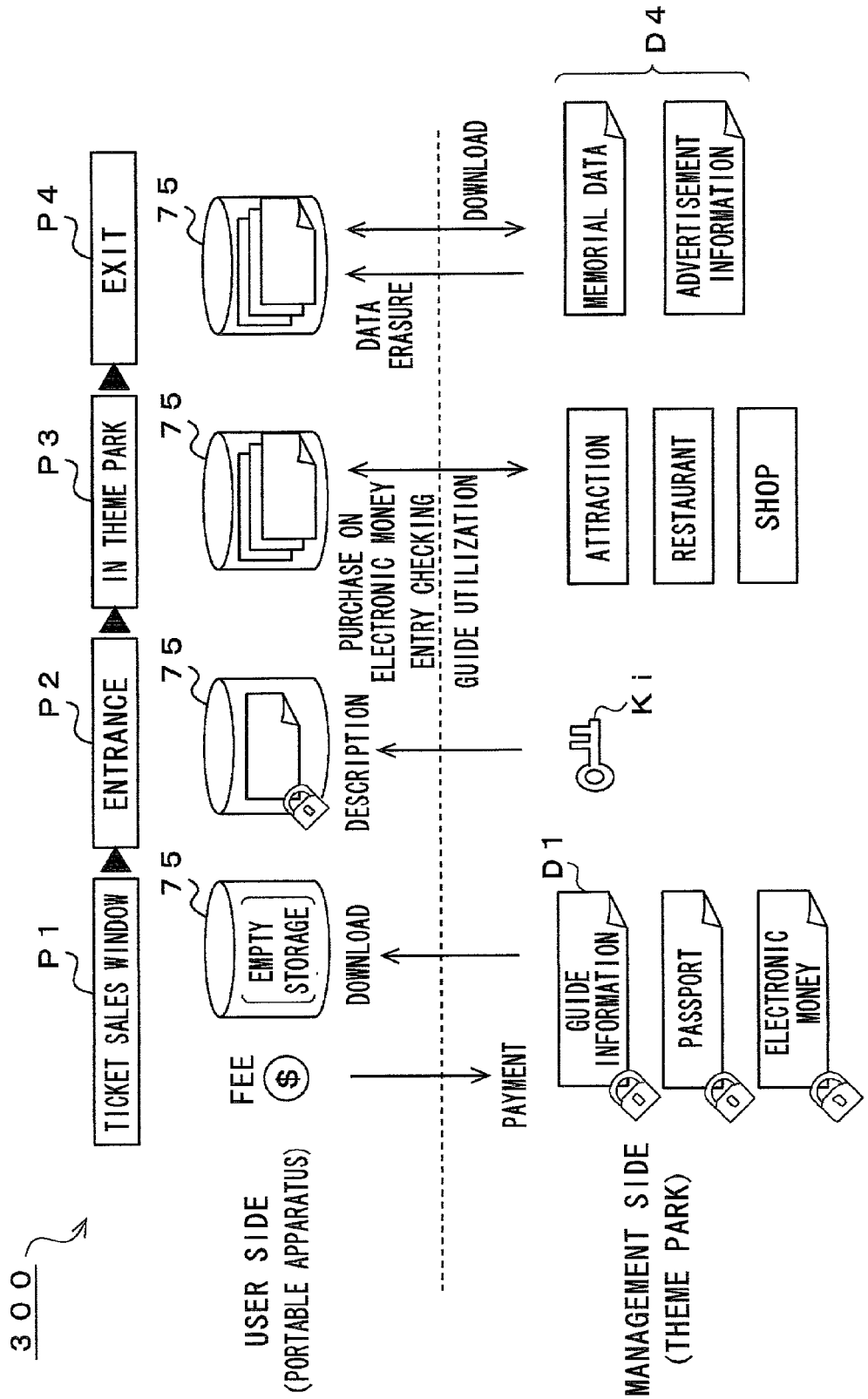
FIG. 19 is a flow chart showing an exemplary processing performed in a pocket theme park system 300 in a third example according to the present invention.

Next, an exemplary processing performed in a third pocket theme park system 300 will be described. FIG. 19 is a flow chart showing an exemplary processing performed in the pocket theme park system 300 in a third example according to the present invention.

In FIG. 19, the reference numerals P1 to P4 denote points at which a portable terminal apparatus 14 is manipulated. The upper side shows a recording state of a data storage 75 of the portable terminal apparatus 14 carried by the user (i.e. visitor). The lower side shows information provided by a terminal apparatus 39 for ticket sales window at the theme park management, an entrance gate terminal apparatus 21, a terminal apparatus in a facility such as a restaurant (not shown), and an exit gate terminal apparatus 59. Obviously, a portable telephone 401 described above in the second example may be used, instead of the portable terminal apparatus 14.

In this example, description will be made on the following assumption. That is, when electronic guide information D1 is processed in a theme park 10 shown in FIG. 15 which restricts the visitor to go in and out only through its entrance 11 and exit 12, at least the entrance gate terminal apparatus 21 is provided in the vicinity of the entrance, while the exit gate terminal apparatus 59 is provided in the vicinity of the exit. In addition, the reading of the electronic guide information D1 is permitted at the entrance 11, while the reading thereof is inhibited at the exit 12. Obviously, description will be made taking a case as an example where the portable terminal apparatus 14 is prepared for each of the visitor 20.

On the assumption described above, when the visitor enters into the theme park 10 which restricts the visitors to go in and out only through its entrance 11 and exit 12, the user (i.e. visitor 20) purchases a ticket by paying admission fee at the ticket sales window at the point P1 shown in FIG. 19. At the same time of purchasing the ticket, the user may also purchase a passport which is a ticket for using each attraction and electronic money usable in the theme park. The electronic money is local currency information which is effective only within this theme park.

When these purchasing processings are completed, the electronic guide information D1 is downloaded from the terminal apparatus 39 for ticket sales window to the portable terminal apparatus 14. In accordance with the purchase status, passport information and electronic money information are also downloaded. At this time, the electronic guide information D1, the passport information, and the electronic money information are locked by use of a secret key.

Then, the visitor 20 goes to the entrance 11 at the point P2, carrying the portable terminal apparatus 14 with him or her. At the entrance 11, the portable terminal apparatus 14 carried by the visitor 20 is electrically attached to the entrance gate terminal apparatus 21 located in the vicinity of the entrance. At this time, a release key code Ki is distributed from the release key data base 61 within the entrance gate terminal apparatus to the data storage 75 of the portable terminal apparatus 14. As a result, the electronic guide information D1, the passport information, and the electronic money information are decrypted by this key code Ki, so as to be released.

In this manner, the reading of the downloaded electronic guide information D1 and the like is permitted at the portable terminal apparatus 14. Therefore, the visitor 20 can always reproduce the electronic guide information D1 freely at any time and at any number of times, during the visitor 20's stay in the theme park 10. For example, the electronic guide information D1 is read in the displaying section 6 of this portable terminal apparatus 14 based on the program information D2 within the area at the point P3, or is visually displayed so as to allow the search of attractions and restaurants, or is audibly output so as to announce the result of such search.

In this manner, various kinds of guide information can be comfortably searched and displayed in the portable terminal apparatus 14 of the visitor 20. When the visitor 20 who has purchased the passport information and the electronic money information utilizes a facility in the theme park such as a restaurant, the information about use status of the restaurant, the information about the use status of the attraction, the information about he use status of shop, and the like are downloaded from the terminal apparatus located at each of the facilities to the portable terminal apparatus 14. At this time, if the visitor 20 uses the electronic money information, the electronic money corresponding to the purchase price is subtracted. Then, receipt information about this use is recorded in the portable terminal apparatus 14.

After that, when the visitor 20 is leaving for this theme park 10, the electronic guide information D1 in the portable terminal apparatus 14 is erased by the exit gate terminal apparatus 59 provided in the vicinity of the exit at the point P4. Obviously, reimbursement for the electronic money information is also made. In return for the these information, visit memorial data as visit recording information D4 and advertisement (Sales Promotion) information about this theme park 10 are written into the portable terminal apparatus 14. Due to this arrangement, the visitor 20 can make the portable terminal apparatus 14 to display the visit memorial data, or to display the advertisement information about the attractions scheduled at the next time in this theme park 10.

As has been described above, in the pocket theme park system 300 in the third example according to the present invention, in the theme park 10 which restricts the visitor to go in and out only through its entrance 11 and exit 12, the visitor can freely read and reproduce the lent electronic guide information D1 at the portable terminal apparatus 14, as far as he or she stays in the theme park 10.

Furthermore, an entrance ticket such as that required in a conventional system becomes unnecessary, thereby realizing a paperless system in the customers attracting facility. Besides, by introducing a LAN or internet accounting facility by use of a portable terminal apparatus 14, it becomes possible to realize a moneyless system in the customers attracting facility. As a result, increased safety is attained.

At the time when the electronic guide information D1 is downloaded at the ticket sales window, the ticket data may be downloaded simultaneously. This eliminates the need of a paper ticket. In this case, at each attraction, the ticket and passport can be electronically checked by use of infrared ray communication function of the portable terminal apparatus 14.

In addition, the entry of the visitor into the restaurants and shops is checked by infrared ray communication, and benefits such as discounts or novelties are given to the visitor for these visits. In this manner, the trails of the user on that one day is saved in the portable terminal apparatus 14, and the evidence packing contents described above are realized with more reality.

Furthermore, the introduction of the electronic money information eliminates all the needs of tickets, money, credit cards, receipts and the like within this theme park. Obviously, there is no need of guidebooks. As a result, the visitor can act comfortably in a completely paper-free state.

(6) Fourth Example

Figure 20:
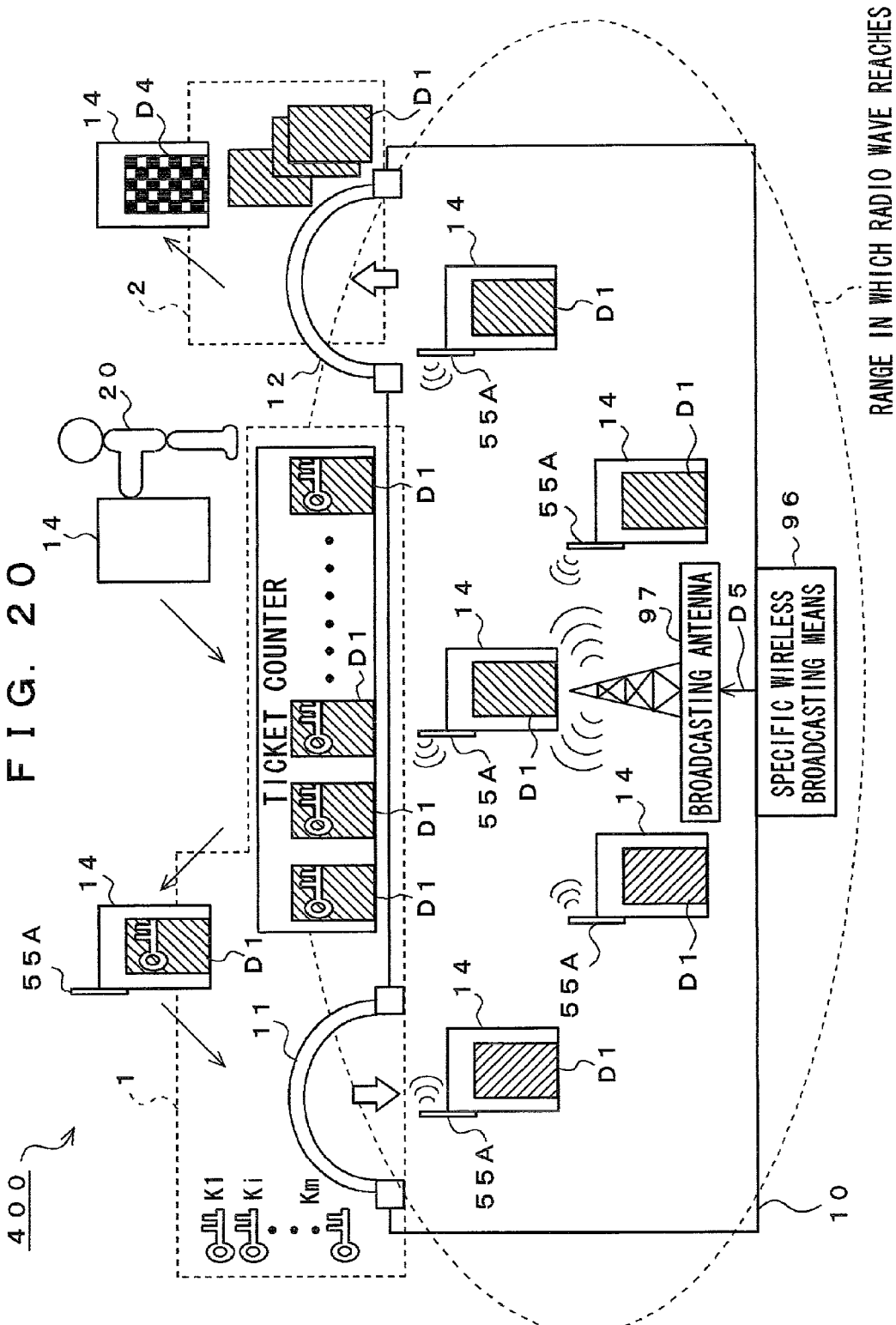
FIG. 20 is an image diagram showing an exemplary structure of a pocket theme park system 400 in a fourth example according to the present invention.

FIG. 20 is an image diagram showing an exemplary structure of a pocket theme park system 400 in a fourth example according to the present invention.

In this example, in order to constitute a real-time guide system, specific wireless broadcasting means 96 effective only within the target area is provided in a theme park 10. Electronic guide information D1 is distributed from the specific wireless broadcasting means 96 to the portable terminal apparatus 14. Obviously, it is assumed that receiving means 55A for receiving a wireless broadcasting signal from the specific wireless broadcasting means 96 is provided to the portable terminal apparatus 14. The constituent elements denoted by the same names and having the same names as those of the third example have the same functions, and therefore, their descriptions will be omitted.

In the pocket theme park system 400 shown in FIG. 20, for example, the specific wireless broadcasting means 96 is provided to the park office. To the specific wireless broadcasting means 96, connected is a broadcasting antenna 97 for broadcasting real-time information D5. The real-time information D5 includes time-varying information such as information about waiting time for attractions, information about the initiation of parades and shows, information about bargain sales at shops, information about lunch-time services at restaurants, as well as yellow page information such as information about missing children or cautions.

The broadcasting antenna 97 is located substantially in the middle point of the theme park. The radio output of the broadcasting antenna 97 is restricted so as to reach only within a certain range from the middle point. The oval-shaped section encapsulated with a broken line in FIG. 20 shows the range in which the radio wave reaches. As the specific wireless broadcasting means 96, the use of a wireless facility such as a pager is conceivable. As far as legally permitted, it is also possible to use an apparatus having substantially the same structure as of the information distributing apparatus 19 described above with reference to FIG. 6, but having a radio output smaller than the specific wires broadcasting means located in the broadcast station 9. The real-time information D5 such as described above is transmitted from the park office to the specific wireless broadcasting means 96, so as to be broadcast in a real-time manner.

As the portable terminal apparatus 14, the portable telephone 401 with tuner function described above with reference to FIG. 12 is used. If the portable terminal apparatus 14 does not have such a receiving function, the receiving means 55A may be lent at the entrance 11 of the theme park 10. The receiving means 55A is constituted by forming beforehand the tuner 55 such as that mounted to the portable telephone 401 into a communication module capable of being detachably mounted. The resultant receiving means 55A is mounted to a terminal 69 of the portable terminal apparatus 14 at the ticket sales window, so as to be connected to an external interface 67. At the ticket sales window, plural communication modules may be prepared beforehand.

The electronic guide information D1, which has been received by the tuner 55 of the portable telephone 401 or the lent communication module, is correlated with the electronic guide information D1 which has already been stored in the portable terminal apparatus 14 and the portable telephone 401. In this manner, the real-time electronic guide information D1 which changes every moment can be sequentially taken into the portable terminal apparatus 14 or the portable telephone 401 carried by the visitor 20 at the large-scale leisure facility such as a theme park 10 and an even hall. As a result, increased convenience is afforded to the visitor 20.

For example, the real-time information D5 is provided from the specific wireless broadcasting means 96 and is received by the tuner 55 through the broadcasting antenna 97. When received by the tuner 55, the real-time information D5 is correlated with, by the microcomputer 90, the electronic guide information D1 which has been already stored in the flash memory 33. In this example, when an attraction is clicked on the map displayed on a liquid crystal display monitor 122, the waiting time for the attraction is displayed, or the course of the parade which will be started is displayed on the map.

As described above, in the pocket theme park system 400 in the fourth example according to the present invention, the specific wireless broadcasting means 96 is provided to the theme park 10. In addition, the real-time information D5 is broadcast from the specific wireless broadcasting means 96 to the portable terminal apparatus 14. In this manner, the real-time electronic guide information D5 which changes every moment can be sequentially taken into the portable telephone 401 carried by the visitor 20 at the large-scale leisure facility such as a theme park and an even hall.

As a result, the visitor 20 can obtain up-to-dated information about the theme park in a real-time manner. In this manner, when the visitor 20 searches the information about the theme park by the portable telephone 401, or during the time when the visitor 20 is waiting for his or her turn to enter into the attraction, the telephone rings as if the radio call by the pager, thereby allowing the visitor 20 to obtain the real-time information D5. In addition, the information about the waiting time for each attraction is updated before the visitor 20 knows it. In this case, the visitor 20 can obtain the latest information every time he or she searches the information.

(7) Fifth Example

Figure 21:
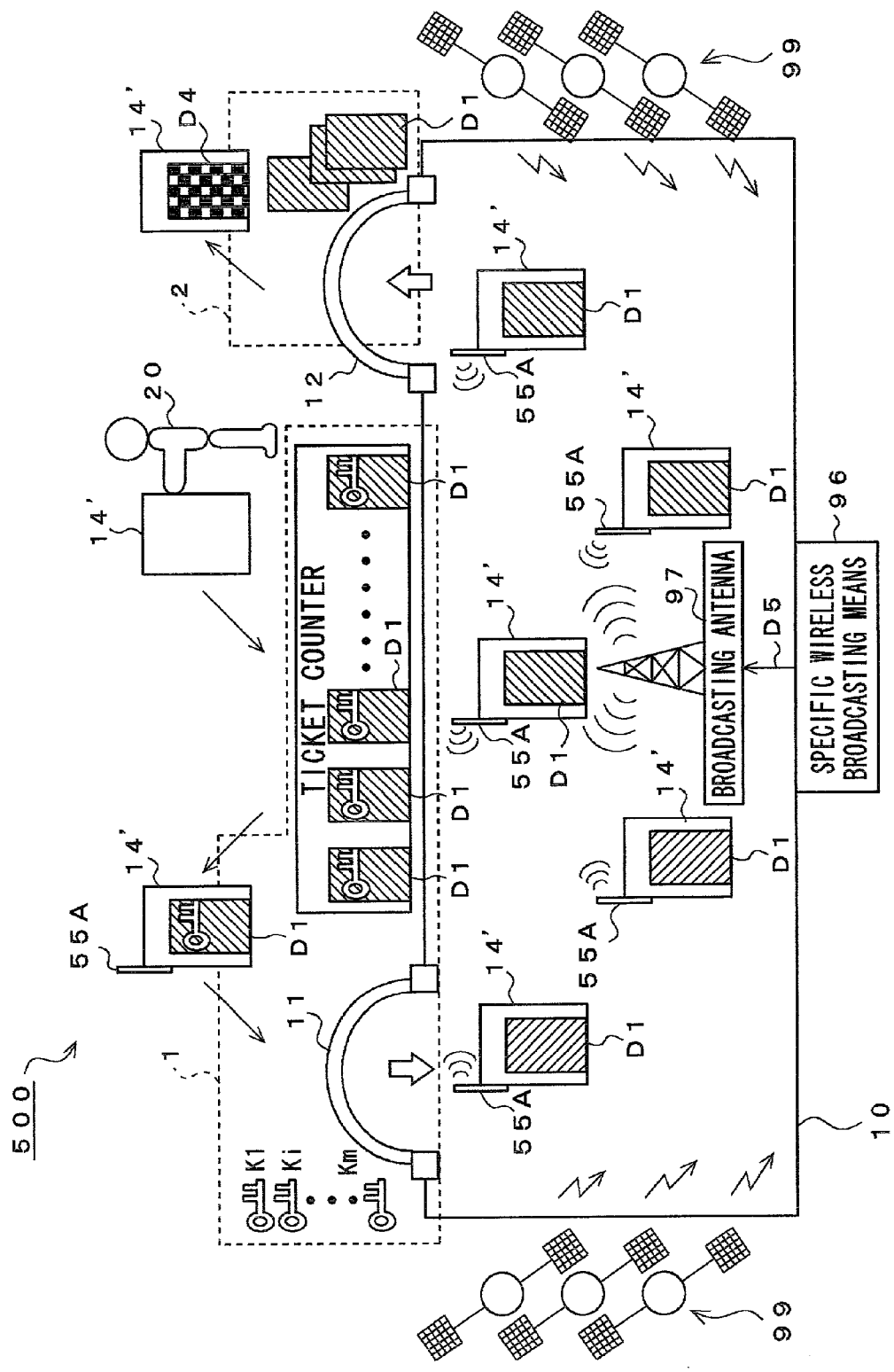
FIG. 21 is an image diagram showing an exemplary structure of a pocket theme park system 500 in a fifth example according to the present invention.

FIG. 21 is an image diagram showing an exemplary structure of a pocket theme park system 500 in a fifth example according to the present invention.

In this example, in order to constitute a navigation system, a global positioning system (GPS) module 103 as position measuring means is mounted to a portable terminal apparatus 14 such as a portable telephone 401. By use of an artificial satellite 99 and the specific wireless broadcasting means 96 described above in the fourth example, the latitude, longitude, and height are measured, so as to specify the position of this portable terminal apparatus itself. The constituent element denoted by the same reference numerals and having the same names have the same functions as of the fourth example have the same functions, and therefore, their descriptions will be omitted.

In the pocket theme park system 500 shown in FIG. 21, it is preferable to use a GPS module incorporating type portable terminal apparatus 14'. Alternatively, the portable terminal apparatus 14 or the portable telephone 401 is optionally purchased, and after that, a GPS receiver or a decoding circuit may be mounted thereto. When the portable terminal apparatus 14 does not have a GPS module 103, the GPS module 103 may be lent at an entrance 11 of the theme park 10.

Figure 22:
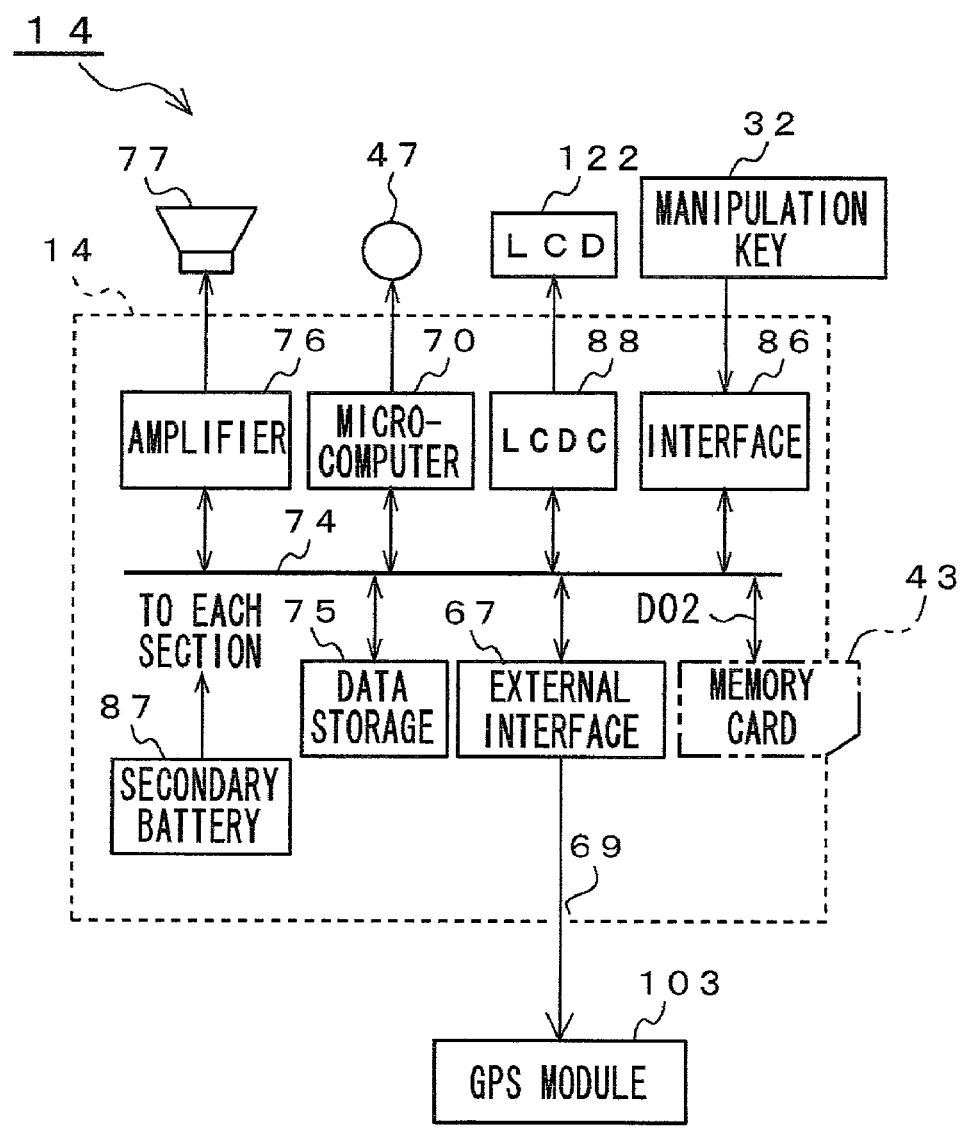
FIG. 22 is a block diagram showing an exemplary connection to a GPS module 103.

In this example, the GPS module 103 is mounted to a terminal 69 of the portable terminal apparatus 14 shown in FIG. 22, in the same manner as the case of mounting the receiving means 55A described above in the fourth example. In this state, the GPS module 103 is connected to an external interface 67. In relation to the fourth example, either one of the GPS module 103 or the receiving means 55A can be mounted to the portable terminal apparatus 14. Alternatively, a hybrid module constituted by combining the GPS module 103 with the receiving means 55A may be lent. At the ticket sales window, the plural GPS modules 103 may be prepared beforehand.

The principle of the global positioning system is as follows. The system is constituted by 24 artificial satellites 99, the specific wireless broadcasting means 96 for example as a ground control station, and the portable terminal apparatus 14 with GPS function carried by the visitor 20. In this system, the distances between the portable terminal apparatus 14 and three or more GPS satellites are measured. Then, the position on a two-dimensional plane of the person who is carrying the portable terminal apparatus 14 is specified from calculation.

When four or more GPS satellites are used, the position on a three-dimensional plane of the visitor 20 can be measured. The distance between each of the GPS satellite and the portable terminal apparatus 14 is calculated from the time required until the radio wave reaches therebetween. A time signal from each of the GPS satellites is managed by the specific wireless broadcasting means 96. The time required for transmission can be obtained by measuring the difference in the time signal received by the portable terminal apparatus 14 and the time shown by the specific wireless broadcasting means 96.

In this example, the measurement information obtained from the GPS module 103 is correlated with the map information about the theme park which has been already stored in the data storage 75 of the portable terminal apparatus 14 and the like. For example, the position where the visitor stays now is simultaneously displayed on the map of the theme park 10 in the liquid crystal display monitor 122.

As a result, in large-sized leisure facilities such as theme parks and event halls, the radio waves from the plural GPS satellites are received by the GPS module 103. Then, the microcomputer 70 and the like performs calculation to obtain the position where the visitor stays now. In this manner, a navigation function is realized. The navigation function allows the visitor to significantly acts in the theme park. The visitor 20 never loses his or her way in the theme park, as far as the visitor 20 stays in open-air spaces which the artificial satellite 99 can observe.

In addition, the trails of actions by the visitor 20 on that day can be recorded more clearly, as compared with the fourth example. Therefore, the evidence packing described above can be produced in further detailed manner. When differential correction data is distributed from the specific wireless broadcasting means 96 described above with reference to FIG. 20, each portable terminal apparatus 14 calculates the current position based on the differential correction data. In this case, highly accurate positional information can be obtained (DGPS). As a result, increased convenience is afforded to the visitor 20, as well as decreasing the number of missing children.

As has been described above, the first electronic guide information processing system according to the present invention, includes: an information distributing apparatus for, when the guide information about customers attracting facility is electronically processed, converting the guide information into electronic guide information, and then distributing the resultant data; and a portable terminal apparatus for recording and reproducing the electronic guide information. The electronic guide information is visually displayed or/and audibly output in the portable terminal apparatus.

In this manner, the information user can obtain the guide information about customers attracting facility in the form of electronic information, instead of in the form of conventional paper materials such as guidebooks and guide maps. Besides, by employing a system in which the electronic guide information is distributed through broadcasting or communication infrastructure, the user can easily and timely obtain the guide information about the customers attracting facility before he or she actually visits there.

Furthermore, when there are changes in attractions in the theme park or event hall, the user can timely obtain such information. As a result, it is possible to increase the effect of collecting customers to large-sized leisure facilities such as theme parks, event halls, huge shopping malls, and the like. In addition, the economic activities in such customers attracting facilities are promoted. Furthermore, preferable influence to recent economy can be expected, resulting in business enhancement.

The second electronic guide information processing system according to the present invention includes: an information lending apparatus for, in the case of processing the electronic guide information about the customers attracting facility which restricts the customers to go in and out only through its entrance and exit, lending the electronic guide information; a portable terminal apparatus for recording and reproducing the electronic guide information which has been lent; and an information collecting apparatus for collecting the electronic guide information. This system performs processings such that the reading of this electronic guide information is permitted at the entrance, while the reading thereof is inhibited at the exit.

In this manner, as far as the information user stays in the customers attracting facility, he or she can read and reproduce the lent electronic guide information freely. In addition, an entrance ticket such as that required in a conventional system becomes unnecessary, thereby realizing a paperless system in the customers attracting facility. Besides, by introducing a LAN or internet accounting facility by use of a portable terminal apparatus, it becomes possible to realize a moneyless system in the customers attracting facility. As a result, increased safety is attained.

The information distributing apparatus according to the present invention includes a transmitting section for distributing guide information about the customers attracting facility. A group of data strings for the electronic information contents about the guide information is constructed, and then is inserted into a signal for transmission. The signal for transmission is transmitted to the portable terminal apparatus carried by the information user.

Due to this structure, the information user can receive the group of the data strings at his or her portable terminal apparatus at a time within a predetermined period, and can stores the group of the data strings in the storage apparatus and the like at a time. As a result, the information user can obtain the guide information about the customers attracting facility easily and timely, before he or she actually visits there.

In addition, after receiving the electronic guide information, the information user freely reads the guide information about the customers attracting facility in an unreal time manner (i.e. in an asynchronous manner), so as to see or listen to the video or audio information about the theme park or the event hall. Furthermore, this system allows the information provider to update information about the construction of a new theme park or event hall, or a change in the attraction in a real-time and smooth manner.

In the portable terminal apparatus according to the present invention, in the case of obtaining and processing the guide information about the customers attracting facility, the electronic guide information is received and stored. In accordance with the information manipulation by the information user, the electronic guide information is read in an asynchronous manner. At the same time, the electronic guide information is visually displayed or/and audibly output.

Due to this structure, the information user can obtain the guide information about the customers attracting facility easily and timely, before he or she actually visits there. In addition, after receiving the electronic guide information, the information user freely reads the guide information about the customers attracting facility in an unreal time manner (i.e. in an asynchronous manner), so as to see or listen to the video or audio information about the theme park or the event hall. Even if a new theme park or a new event hall is constructed, or there is a change in the attraction, the user can timely obtain the information about such changes.

In the first method for processing the electronic guide information according to the present invention, in the case of electronically processing the guide information about the customers attracting facility, the information provider produces electronic guide information based on the guide information. At the same time, the information provider distributes the electronic guide information to the portable terminal apparatus which the information user carries. The information user obtains the distributed electronic guide information. The electronic guide information is visually displayed or/and audibly output.

Due to this structure, the information user can obtain the guide information about customers attracting facility in the form of electronic information, instead of in the form of conventional paper materials such as guidebooks and guide maps. Besides, by employing a system in which the electronic guide information is distributed through broadcasting or communication infrastructure, the information user can easily obtain the guide information about the customers attracting facility before he or she actually visits there. When new theme parks or event halls are constructed, or there are changes in attractions, such information can be updated in a real-time and smooth manner.

In the second method for processing the electronic guide information according to the present invention, in the case of processing the electronic guide information about the customers attracting facility which restricts the customers to go in and out only through its entrance and exit, the electronic guide information is lent to the portable terminal apparatus carried by the information user. The electronic guide information which has been lent is collected at the exit.

In this manner, as far as the information user stays in the customers attracting facility, he or she can use the lent electronic guide information freely. In addition, an entrance ticket such as that required in a conventional system becomes unnecessary, thereby realizing a paperless system in the customers attracting facility. Besides, by introducing a LAN or internet accounting facility by use of a portable terminal apparatus, it becomes possible to realize a moneyless system in the customers attracting facility. As a result, increased safety is attained.

The present invention is extremely preferable when applied to an electronic guide system in a theme park, an event hall, a huge shopping mall, and the like.

What is claimed is:

1. An electronic guide information processing system for electronically processing guide information about a place, the system comprising:
    an information distributing apparatus for converting the guide information into electronic guide information, encrypting the electronic guide information, and then distributing the encrypted electronic guide information;
    a portable terminal apparatus for recording the encrypted electronic guide information, decrypting the encrypted electronic guide information, and presenting the electronic guide information; and
    an information processing apparatus for erasing the electronic guide information from the portable terminal apparatus and writing in the portable terminal apparatus of information about the place, wherein the erasing and the writing are performed at the same area.

2. The electronic guide information processing system according to claim 1, wherein the encrypted electronic guide information is distributed to the portable terminal apparatus by use of an already-existing broadcasting infrastructure or/and a communication infrastructure.

3. The electronic guide information processing system according to claim 1, wherein an information recording medium is mounted to the portable terminal apparatus, and
    wherein the electronic guide information about the place is recorded in the information recording medium.

4. The electronic guide information processing system according to claim 3, wherein the information recording mediums is provided by use of an already-existing sales infrastructure.

5. The electronic guide information processing system of according to claim 1, wherein the information processing apparatus writes at least one of advertisement information about the place and information about use of the place in the portable terminal apparatus.

6. An electronic guide information processing system for processing guide information about a place, the system comprising:
- an information providing apparatus for converting the guide information into electronic guide information, encrypting the electronic guide information, and providing the encrypted electronic guide information;
- a portable terminal apparatus for recording the encrypted electronic guide information, decrypting the encrypted electronic guide information, and presenting the electronic guide information, which has been provided from the information providing apparatus; and
- an information processing apparatus for erasing the electronic guide information from the portable terminal apparatus and writing information about the place in the portable terminal apparatus at the same area; and
- wherein reading of the electronic guide information is permitted inside the place, while reading of the electronic guide information is inhibited outside the place.

7. The electronic guide information processing system according to claim 6, wherein specific wireless broadcasting means effective in a target area is provided to the place, and
wherein the encrypted electronic guide information is provided to the portable terminal apparatus from the specific wireless broadcasting means.

8. The electronic guide information processing system according to claim 6, wherein the portable terminal apparatus comprises receiving means for receiving a wireless broadcasting signal from the specific wireless broadcasting means.

9. The electronic guide information processing system according to claim 8, wherein, when the portable terminal apparatus does not have the receiving means,
the receiving means is provided at the place.

10. The electronic guide information processing system according to claim 8, wherein the electronic guide information received by the receiving means is correlated with electronic guide information which has been already stored in the portable terminal apparatus.

11. The electronic guide information processing system according to claim 6, wherein the portable terminal apparatus comprises position measuring means for measuring latitude, longitude, and height by use of an artificial satellite, so as to specify the position of this portable terminal apparatus itself.

12. The electronic guide information processing system according to claim 11, wherein, when the portable terminal apparatus does not have the position measuring means, the position measuring means is provided at the place.

13. The electronic guide information processing system according to claim 11, wherein the measurement information obtained by the position measuring means is correlated with map information about the place which has been already stored in the portable terminal apparatus.

14. The electronic guide information processing system of according to claim 6, wherein at least one advertisement information about the place and information about use of the place is written in the portable terminal apparatus.

15. A portable terminal apparatus for obtaining and processing electronic guide information about a place, the portable terminal apparatus comprising:
- a manipulating section manipulated in order to input manipulation information about the electronic guide information;
- a receiving section for receiving encrypted electronic guide information;
- a storing apparatus for storing the encrypted electronic guide information received by the receiving section;
- a decrypting section for decrypting the encrypted electronic guide information; and
- a controlling apparatus for reading the electronic guide information from the storing apparatus in accordance with the manipulation information from the manipulating section and processing the electronic guide information to control an image display,
- wherein the controlling apparatus erases the electronic guide information from the storing apparatus and writes in the storing apparatus information about the place at the same area.

16. The portable terminal apparatus according to claim 15, wherein the controlling apparatus processes the electronic guide information to control a display of an image of the place made of a three-dimensional image.

17. The portable terminal apparatus according to claim 15, wherein a communication modem is connected to the controlling apparatus, so as to receive the electronic guide information distributed by use of an already-existing communication infrastructure.

18. The portable terminal apparatus according to claim 15, wherein, when specific wireless broadcasting means effective only in a target area is provided to the place, the controlling apparatus receives the electronic guide information from the specific wireless broadcasting means by the receiving section.

19. The portable terminal apparatus according to claim 18, wherein the encrypted electronic guide information received by the receiving section is correlated with electronic guide information which has already been stored in the storing apparatus.

20. The portable terminal apparatus according to claim 15, wherein position measuring means is connected to the controlling apparatus, and the position of the portable terminal apparatus itself is specified by measuring latitude, longitude, and height by use of an artificial satellite.

21. The portable terminal apparatus according to claim 20, wherein the measurement information obtained by the position measuring means is correlated with map information about the place which has been already stored in the storing apparatus.

22. The portable terminal apparatus according to claim 9, wherein the controlling apparatus writes at least one of advertisement information about the place and information about use of the place in the storing apparatus.

23. A method for processing electronic guide information which electronically processes guide information about a place, the method comprising:
- producing electronic guide information at an information provider side by converting the guide information;
- encrypting the electronic guide information at the information provider side;
- distributing the encrypted electronic guide information to a portable terminal apparatus;
- obtaining the distributed encrypted electronic guide information;
- decrypting the encrypted electronic guide information;

presenting the electronic guide information;

erasing the electronic guide information from the portable terminal apparatus; and writing in the portable terminal apparatus information about the place, wherein the erasing and the writing are performed at the same area.

24. The method for processing electronic guide information according to claim 23, wherein the encrypted electronic guide information is distributed to the portable terminal apparatus by use of an already-existing broadcasting infrastructure or/and a communication infrastructure.

25. The method for processing electronic guide information according to claim 23, wherein the electronic guide information about the place is recorded in an information recording medium, and the information recording medium is mounted to the portable terminal apparatus.

26. The method for processing electronic guide information according to claim 25, wherein the information recording medium is provided by use of an already-existing sales infrastructure.

27. The method for processing electronic guide information according to claim 23, further comprising writing at least one of advertisement information about the place and information about use of the place in the portable terminal apparatus.

28. A method for processing electronic guide information about a place, the method comprising:

receiving the encrypted electronic guide information to a portable terminal apparatus;

decrypting the encrypted electronic guide information in the portable terminal apparatus;

erasing the electronic guide information from the portable terminal apparatus; and writing in the portable terminal apparatus information about the place, wherein the erasing and the writing are performed at the same area.

29. The method for processing electronic guide information according to claim 28, wherein specific wireless broadcasting means effective only in a target area is provided to the place, and wherein the encrypted electronic guide information is provided to the portable terminal apparatus from the specific wireless broadcasting means.

30. The method for processing electronic guide information according to claim 28, wherein, when the portable terminal apparatus does not have the receiving means, the receiving means is provided at the place.

31. The method for processing an electronic guide information according to claim 30, wherein the electronic guide information received by the receiving means is correlated with electronic guide information which has been already stored in the portable terminal apparatus.

32. The method for processing an electronic guide information according to claim 28, wherein the portable terminal apparatus comprises position measuring means for measuring latitude, longitude, and height by use of an artificial satellite, so as to specify the position of this portable terminal apparatus itself.

33. The method for processing an electronic guide information according to claim 32, wherein, when the portable terminal apparatus does not have the position measuring means, the position measuring means is provided at the place.

34. The method for processing an electronic guide information according to claim 32, wherein the measurement information obtained by the position measuring means is correlated with map information about the place which has been already stored in the portable terminal apparatus.

35. The method for processing electronic guide information according to claim 28, further comprising writing at least one of advertisement information about the place and information about use of the place in the portable terminal apparatus.

\* \* \* \* \*

UNITED STATES PATENT AND TRADEMARK OFFICE
CERTIFICATE OF CORRECTION

PATENT NO. : 7,783,498 B2  Page 1 of 1
APPLICATION NO. : 09/981696
DATED : August 24, 2010
INVENTOR(S) : Eiji Kawai It is certified that error appears in the above-identified patent and that said Letters Patent is hereby corrected as shown below:

*In claim 1, column 36, line 56, before "information", delete "of".

In claim 4, column 37, line 3, "mediums is" should read --medium is--.

In claim 5, column 37, line 5, after "processing system", delete "of".

In claim 14, column 37, line 64, after "processing system", delete "of".

*In claim 22, column 38, line 52, "claim 9," should read --claim 15,--.

Signed and Sealed this

Twenty-third Day of November, 2010

David J. Kappos
*Director of the United States Patent and Trademark Office*